United States Patent
Toyoda et al.

[11] Patent Number: 6,038,362
[45] Date of Patent: Mar. 14, 2000

[54] FIBER COIL REEL

[75] Inventors: Shuhei Toyoda, Nagoya; Takenori Ichigi, Iwakura, both of Japan

[73] Assignee: NGK Insulators, Ltd., Nagoya, Japan

[21] Appl. No.: 09/142,282

[22] PCT Filed: Jan. 23, 1998

[86] PCT No.: PCT/JP98/00275

§ 371 Date: Sep. 4, 1998

§ 102(e) Date: Sep. 4, 1998

[87] PCT Pub. No.: WO98/33040

PCT Pub. Date: Jul. 30, 1998

[30] Foreign Application Priority Data

Jan. 24, 1997 [JP] Japan .................................. 9-011707

[51] Int. Cl.[7] .................................................. G02B 6/00
[52] U.S. Cl. ..................... 385/137; 356/350; 242/445.1; 385/147
[58] Field of Search ............................. 385/13, 123, 135, 385/136, 137, 147; 242/445.1, 412.1, 159, 412.2, 418.1; 356/350

[56] References Cited

U.S. PATENT DOCUMENTS

| 4,743,115 | 5/1988 | Arditty et al. ..................... 242/445.1 |
| 4,752,043 | 6/1988 | Heinzer .............................. 242/412.1 |
| 5,037,204 | 8/1991 | Poisel et al. ........................ 356/350 |
| 5,319,440 | 6/1994 | Kersey et al. ...................... 356/350 |
| 5,444,534 | 8/1995 | Dyott et al. ........................ 356/350 |

FOREIGN PATENT DOCUMENTS

| 64-6720 | 1/1989 | Japan . |
| 4-133205 | 12/1992 | Japan . |
| 8-29184 | 2/1996 | Japan . |
| 8-105749 | 4/1996 | Japan . |
| 8-304082 | 11/1996 | Japan . |

Primary Examiner—Akm E. Ullah
Attorney, Agent, or Firm—Wall Marjama Bilinski & Burr

[57] ABSTRACT

Disclosed is a fiber coil reel 100 associated with an optical fiber 10 wound therearound to make a predetermined number of turns to be used for an optical fiber gyroscope comprising a fiber coil composed of the lengthy optical fiber 10 to make the predetermined number of turns, a coupler 22 for optically coupling an optical fiber 16 led from a light source to an optical fiber 20 to be led to a photodetector, and an optical IC chip arranged between the fiber coil and the coupler 22 and including a phase modulator and a polarizer mounted on an optical waveguide, wherein a space for winding the lengthy optical fiber 10 around the outer circumference is provided, and a through-hole 102 is provided at the central portion, through which a support shaft 74 of an assembling jig 70 is rotatably inserted. Accordingly, the optical fiber gyroscope can be assembled with ease, and it is possible to effectively reduce the production cost of the optical fiber gyroscope.

5 Claims, 14 Drawing Sheets

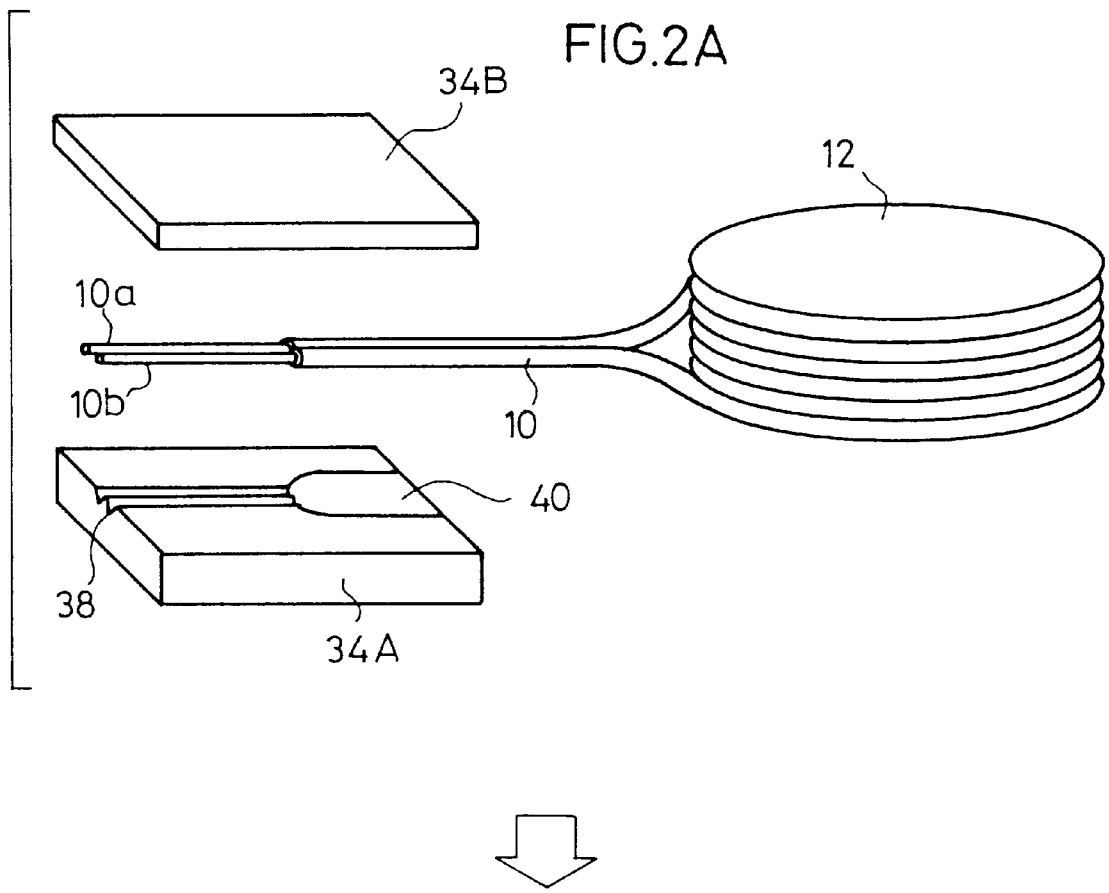
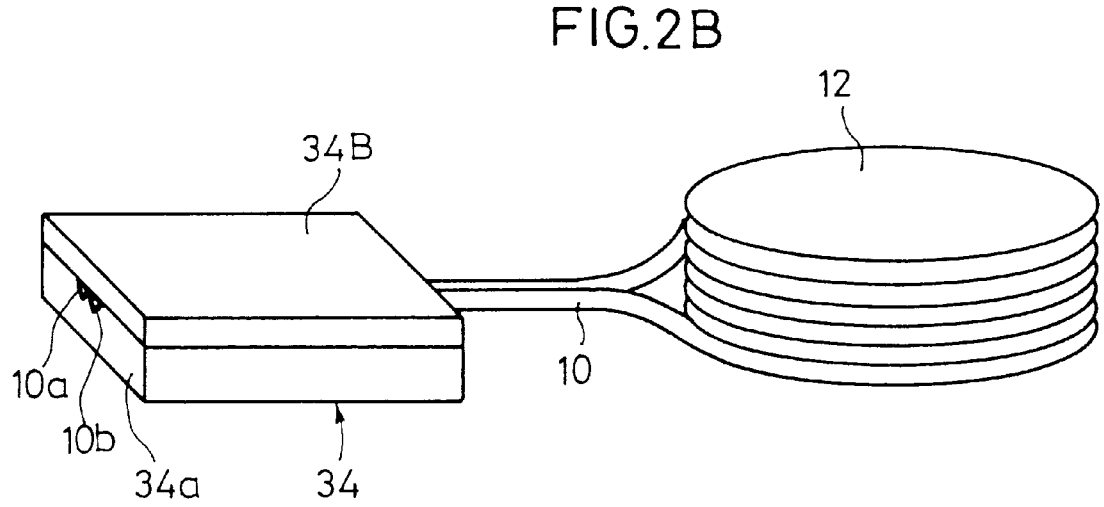

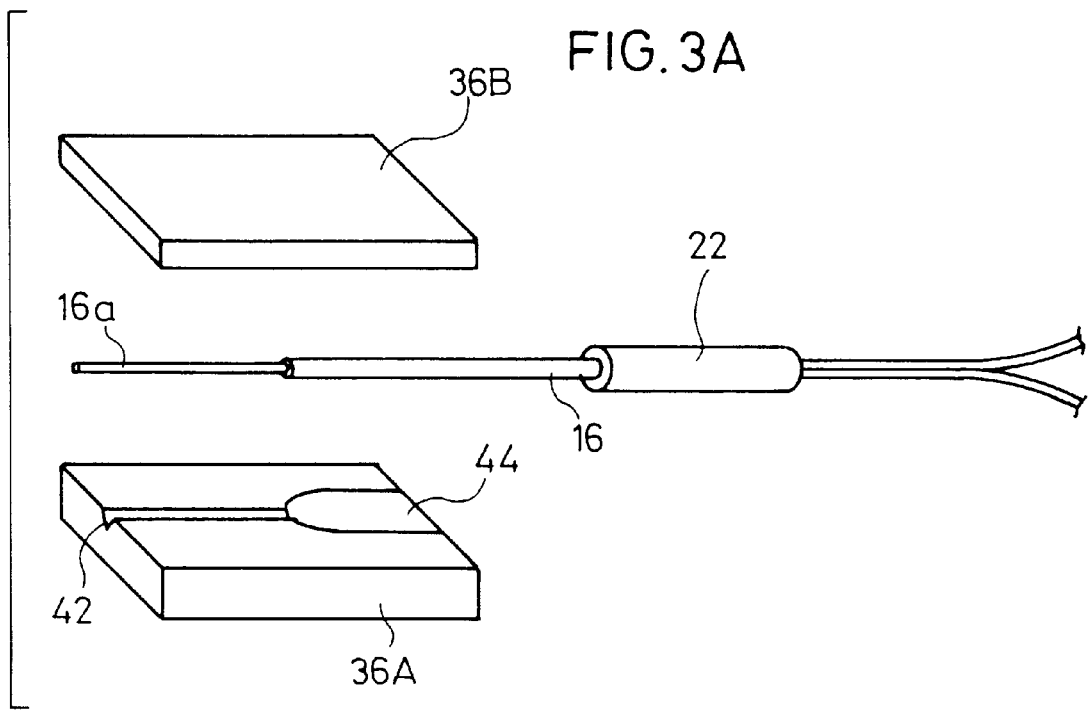
FIG. 3A
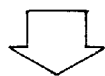
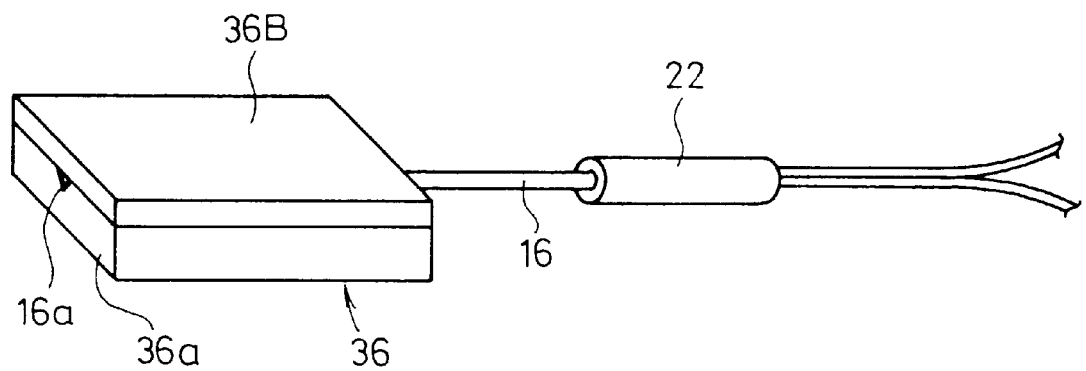
FIG. 3B

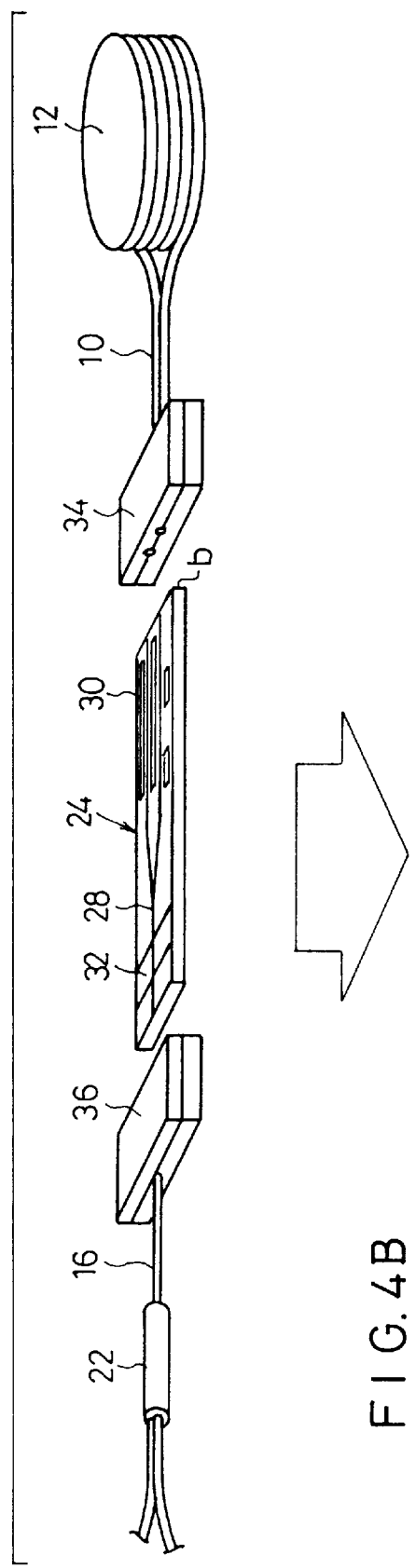
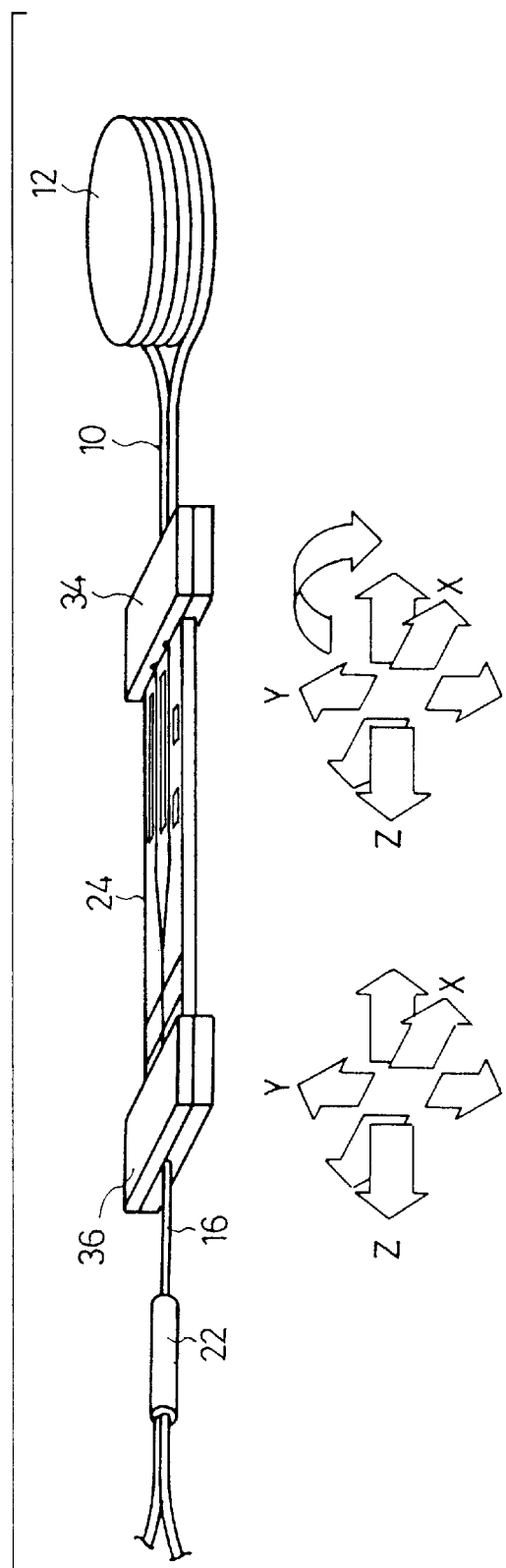
FIG.4A
FIG.4B

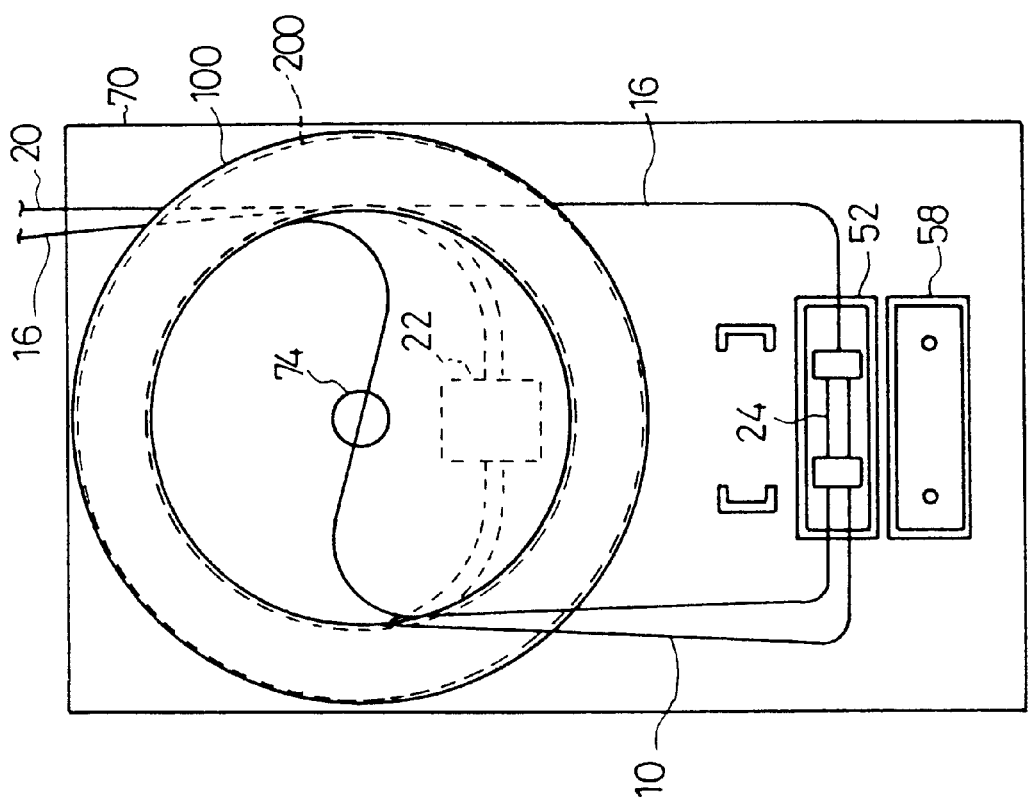
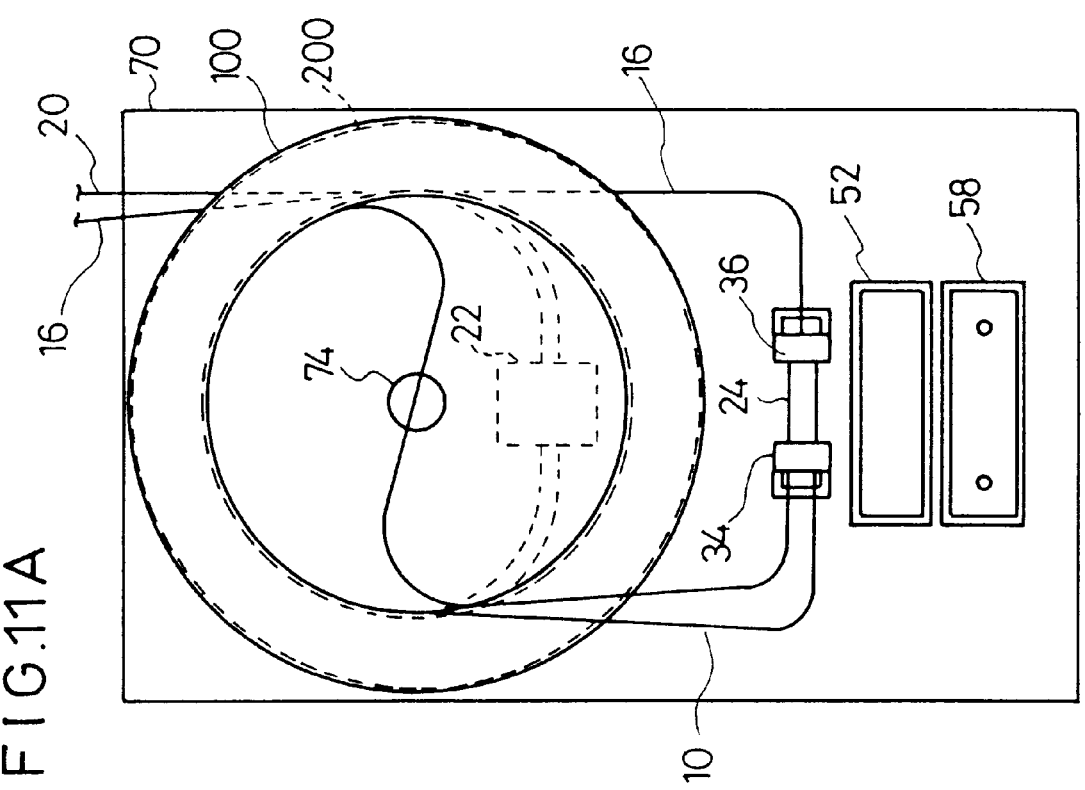

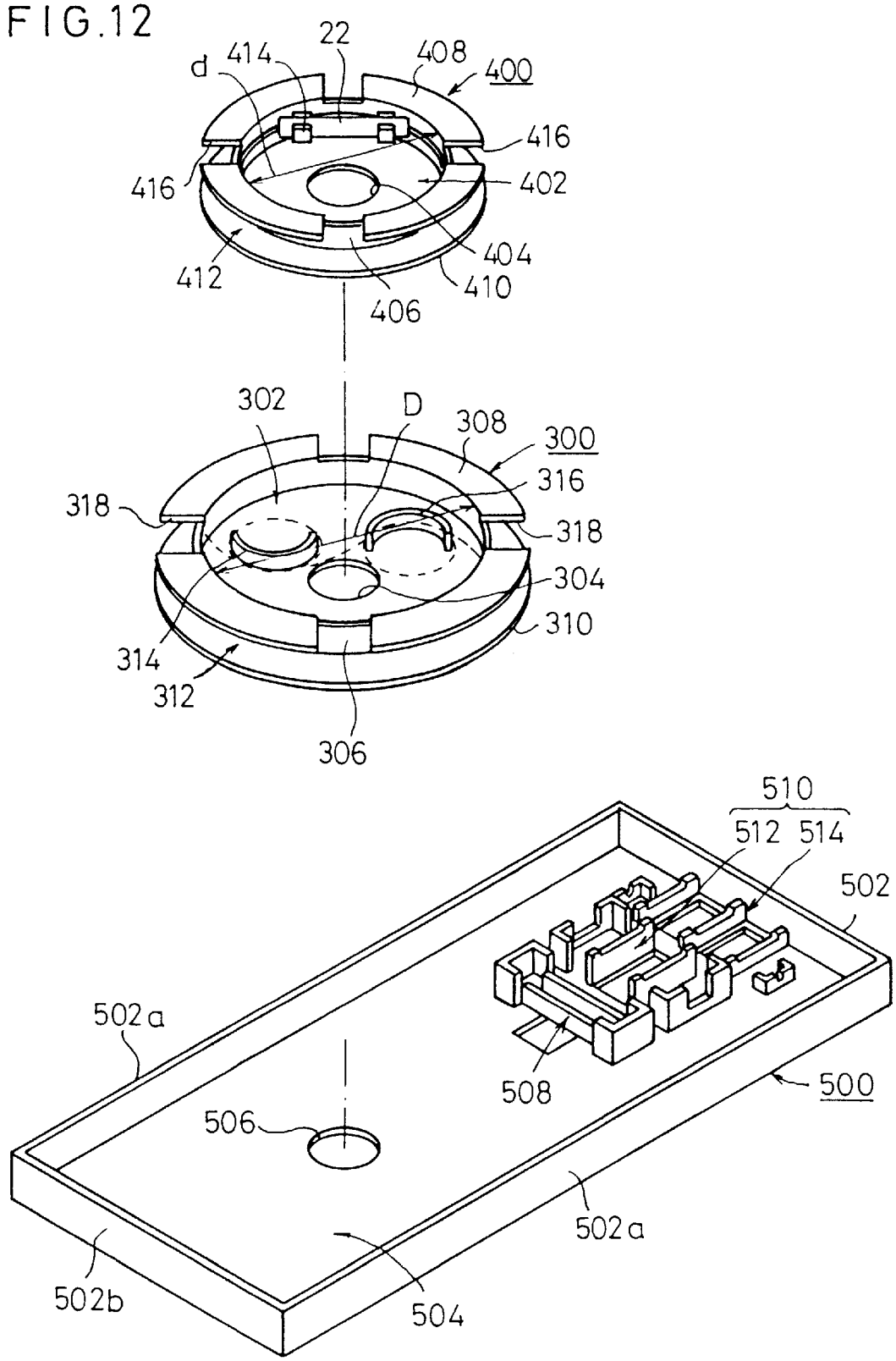

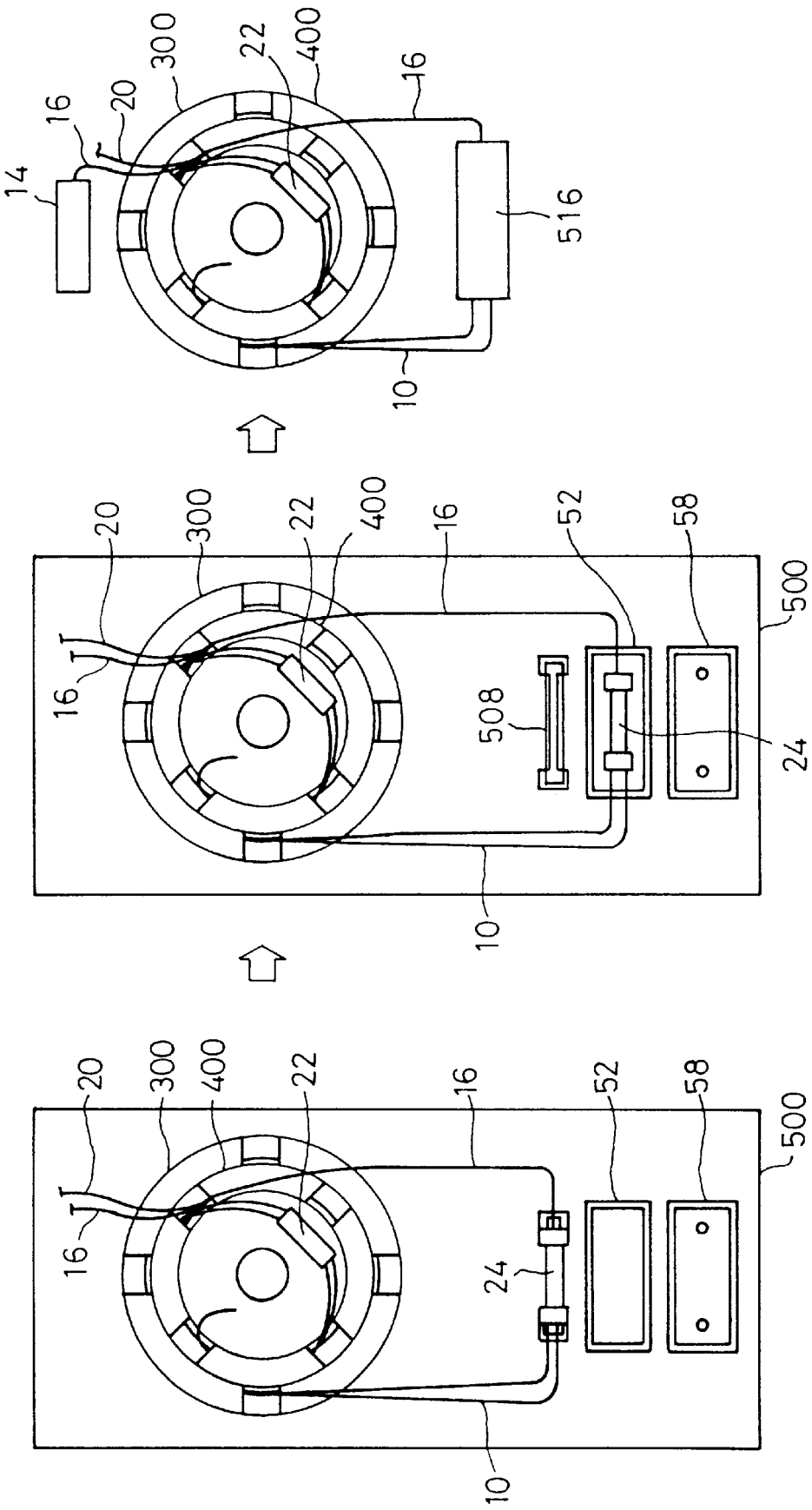

FIBER COIL REEL

TECHNICAL FIELD

The present invention relates to a reel for a fiber coil, which is a constitutive part of an optical fiber gyroscope including the fiber coil formed by winding an optical fiber having a length of, for example, several tens of meters to make a predetermined number of turns, and which makes it possible to handle the fiber coil in a compact form and in an efficient manner upon production.

BACKGROUND ART

Recently, for example, a system has been suggested and practically used, in which a gyroscope is used for a navigation system of an automobile to detect the compass direction or the like of the automobile.

Especially, an optical fiber gyroscope has been suggested, which is extremely advantageous in operability, convenient handling performance, and realization of a compact and light weight system, and which is also advantageous in improvement in durability because there is no mechanically movable component. Development is being rapidly advanced at present in order to practically use such an optical fiber gyroscope.

When it is intended to produce the optical fiber gyroscope which is excellent in, for example, compact and light weight properties and durability as described above, the process for assembling the optical fiber gyroscope especially comprises the steps of winding a lengthy optical fiber around a cylindrical object to produce a fiber coil, optically coupling an optical IC chip (optical waveguide) incorporated with a phase modulator to two ends of the optical fiber led from the fiber coil, optically coupling an optical fiber led from a light source to an optical fiber to be led to a photodetector by using a coupler, optically coupling an optical fiber led from the coupler to the optical IC chip, and packaging the optical IC chip. In this case, a problem arises in that the operation for assembling such an optical fiber gyroscope is extremely complicated.

Especially, the fiber coil comprises the optical fiber which is merely wound around the cylindrical object. Therefore, the wound state is sometimes loosened during the assembling operation, and the cylindrical object is rotated by the human hand one by one to perform the operation. Such an operation is extremely troublesome. When the optical IC chip is packaged, it is necessary to support the long optical fiber in one bundle so that no excessive load is exerted on the optical IC chip by the long optical fiber. As a result, a problem arises in that the operation efficiency is deteriorated.

As described above, the conventional optical fiber gyroscope involves the problems that the assembling operation requires extremely long time, and there is a limit to reduce the production cost.

The present invention has been made taking such problems into consideration, an object of which is to provide a reel for a fiber coil, which makes it possible to easily assemble an optical fiber gyroscope and effectively reduce the production cost of the optical fiber gyroscope.

DISCLOSURE OF THE INVENTION

According to the present invention, there is provided a fiber coil reel associated with an optical fiber wound therearound to make a predetermined number of turns to be used for an optical fiber gyroscope comprising a fiber coil composed of the lengthy optical fiber to make the predetermined number of turns, a coupler for optically coupling an optical fiber led from a light source to an optical fiber to be led to a photodetector, and an optical IC chip arranged between the fiber coil and the coupler and including a phase modulator and a polarizer mounted on an optical waveguide, the fiber coil reel comprising a winding section disposed at its outer circumference for the optical fiber which forms the fiber coil, and a hole disposed at its central portion through which a support shaft is rotatably inserted.

According to the present invention, the lengthy optical fiber for constructing the fiber coil is wound around the winding section which is disposed at the outer circumference. The fiber coil reel, around which the optical fiber is wound, is rotated about the center of the support shaft.

Accordingly, the fiber coil reel is easily rotated, and the optical fiber is freely drawn out upon the operation for assembling the optical fiber gyroscope. Therefore, the assembling operation can be easily performed, and it is possible to finish the operation in a short period of time.

As a result, the lengthy optical fiber for constructing the fiber coil is wound around the fiber coil reel. There is no problem that the long optical fiber for constructing the fiber coil is obstructive during the operation for assembling the optical fiber gyroscope, for example, during the operation in which the optical fiber led from the fiber coil is optically coupled to the optical IC chip, and during the operation in which the optical IC chip coupled with the optical fiber is packaged. There is no inconvenience as well that any excessive load is exerted on the optical IC chip by the long optical fiber.

The fiber coil reel constructed as described above may further comprise a winding direction-reversing section for reversing a winding direction of the optical fiber in the winding section. The winding direction-reversing section may at least comprise, for example, a pair of guide strips which are disposed at positions of point symmetry with each other.

In this embodiment, the terminal end of the optical fiber can be easily led toward the starting end by winding the optical fiber around the winding section of the fiber coil reel in a state in which, for example, the starting end of the optical fiber is gripped, and reversing the winding direction of the optical fiber by using the winding direction-reversing section, for example, in the final turn. It is extremely easy to perform the optical coupling to the optical IC chip thereafter. Especially, the winding direction-reversing section can be easily constructed by using the guide strips. Thus, it is possible to reduce the production cost more efficiently.

In the fiber coil reel constructed as described above, the winding direction-reversing section may further comprise a cutout for leading, to the winding section, the optical fiber for which the winding direction has been reversed. Accordingly, it is possible to smoothly guide, to the winding section, the optical fiber for which the winding direction has been reversed by the winding direction-reversing section.

The fiber coil reel constructed as described above may further comprise a disengagement-preventive means for the optical fiber wound around the winding section. In this embodiment, the optical fiber, which has been wound around the winding section, is prevented from easy disengagement from the winding section, owing to the disengagement-preventive means. Therefore, it is possible to efficiently perform the operation for assembling the optical fiber gyroscope.

BRIEF DESCRIPTION OF THE DRAWINGS

FIG. 2A illustrates a step of fusing a first array to an optical fiber led from a fiber coil.

FIG. 2B illustrates a step of polishing an end surface of the first array.

FIG. 3A illustrates a step of fusing a second array to an optical fiber led from a coupler.

FIG. 3B illustrates a step of polishing an end surface of the second array.

FIG. 4A illustrates a step of adjusting the position for an optical IC chip and the first and second arrays.

FIG. 4B illustrates a step of adjusting the optical axis and gluing the components.

FIG. 11A illustrates a state in which the fiber coil reel and the coupler reel are placed on the assembling jig, and the optical IC chip is temporarily placed on a chip-placing stand.

FIG. 11B illustrates a state in which the optical IC chip is accommodated in a main package body.

FIG. 12 shows a perspective view illustrating an arrangement of the optical fiber gyroscope according to the second embodiment, and an assembling jig used to assemble the optical fiber gyroscope.

FIG. 14A illustrates a state in which a fiber coil reel with a coupler reel accommodated therein is placed on the assembling jig, and the optical IC chip is temporarily placed on a chip-placing stand.

FIG. 14B illustrates a state in which the optical IC chip is accommodated in a main package body.

FIG. 14C illustrates the optical fiber gyroscope assembled into a unit.

BEST MODE FOR CARRYING OUT THE INVENTION

Two illustrative embodiments (referred to as "fiber coil reels according to first and second embodiments" respectively), in which the fiber coil reel according to the present invention is applied to the optical fiber gyroscope, will be explained below with reference to FIGS. 1 to 14.

Figure 1:
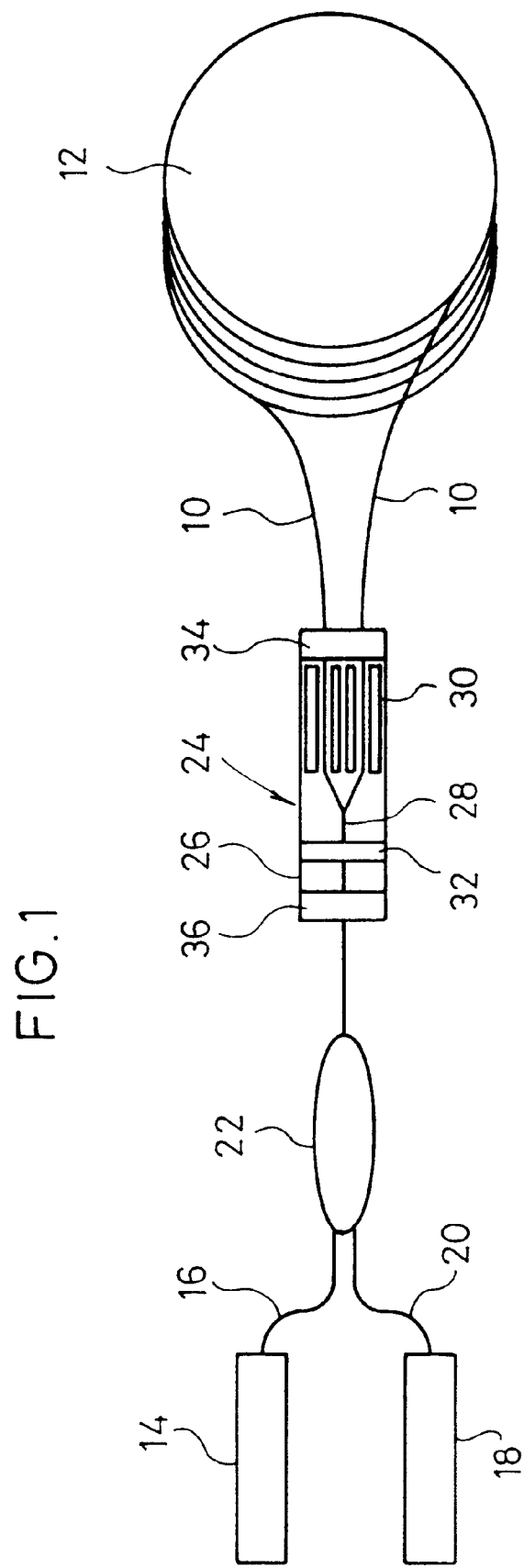
FIG. 1 schematically shows an optical fiber gyroscope (hereinafter simply referred to as "optical fiber gyroscope according to the first or second embodiment") to which a fiber coil reel according to the first or second embodiment is applied.

At first, as shown in FIG. 1, an optical fiber gyroscope (hereinafter referred to as "optical fiber gyroscope according to the first or second embodiment"), to which the fiber coil reel according to the first or second embodiment is applied, comprises a fiber coil 12 composed of a lengthy optical fiber 10 wound therearound to make a predetermined number of turns, a coupler 22 for optically coupling an optical fiber 16 led from a light source to an optical fiber 20 led to a photodetector 18, and an optical IC chip 24 arranged between the fiber coil 12 and the coupler 22. The optical IC chip 24 comprises an optical waveguide 28 having a predetermined shape (for example, a Y-shaped optical waveguide) formed on, for example, an $LiNbO_3$ substrate 26. A phase modulator 30 and a polarizer 32 are mounted on the optical waveguide 28. For example, a super luminescent diode (SLD) can be used as the light source 14.

In this embodiment, as shown in FIG. 2, two ends (starting end 10a and terminal end 10b) of the optical fiber 10 led from the fiber coil 12 are secured to a first array 34 for restricting the direction of joining to the optical IC chip 24. As shown in FIG. 3A, an end of the optical fiber led from the coupler 22 (end 16a of the optical fiber 16 led from the light source 14) is secured to a second array 36 for restricting the direction of joining to the optical IC chip 24. The respective ends 10a, 10b, 16a of the respective optical fibers 10, 16 are optically coupled to the optical IC chip 24 through the first and second arrays 34, 36.

Especially, the first array 34 is secured to the two ends (starting end 10a and terminal end 10b, see FIG. 2A) of the optical fiber 10 led from the fiber coil 12 to form a fiber coil section.

Specifically, as shown in FIG. 2A, the first array 34 comprises a substrate 34A including two V-shaped grooves 38a, 38b extending toward one end surface and a groove 40 extending toward the other end surface which are continuously formed on one principal surface, and a cover substrate 34B for closing the respective grooves 38a, 38b, 40 of the substrate 34A. The two V-shaped grooves 38a, 38b have the same spacing distance therebetween as the spacing distance to make coincidence with optical axes of two branched passages of the optical waveguide 28.

When the first array 34 of the fiber coil section is assembled, at first, as shown in FIG. 2A, the two ends 10a, 10b of the optical fiber 10 led from the fiber coil 12 are embedded in the V-shaped grooves 38a, 38b of the substrate 34A. After that, the polarization-conserving plane of the optical fiber 10 is adjusted to the direction of the plane of polarization of light transmitted through the optical waveguide 28 (for example, the major axis direction of the core cross section is adjusted to the vertical direction). Subsequently, the substrate 34A is covered with the cover substrate 34B thereon to glue the both with an adhesive. As shown in FIG. 2B, an end surface 34a of end surfaces of the first array 34, which is disposed on the side of the free end of the optical fiber 10, is polished to complete the operation for securing the optical fiber 10 to the first array 34.

As shown in FIG. 3A, the second array 36 comprises a substrate 36A including one V-shaped groove 42 extending toward one end surface and a groove 44 extending toward the other end surface which are continuously formed on one principal surface, and a cover substrate 36B for closing the respective grooves 42, 44 of the substrate 36A.

When the second array 34 is assembled, at first, as shown in FIG. 3A, the single end 16a of the optical fiber 16 led from the coupler 22 is embedded in the V-shaped groove 42 of the substrate 36A. After that, the polarization-conserving plane of the optical fiber 16 is adjusted to the direction of the plane of polarization of light transmitted through the optical waveguide 28 (for example, the major axis direction of the core cross section is adjusted to the vertical direction). Subsequently, the substrate 36A is covered with the cover substrate 36B thereon to glue them with an adhesive. As shown in FIG. 3B, an end surface 36a of end surfaces of the second array 36, which is disposed on the side of the free end of the optical fiber 16, is polished to complete the operation for securing the optical fiber 16 to the second array 36.

As shown in FIG. 4A, the first and second arrays 34, 36, to which the optical fibers 10, 16 have been secured, are joined to the single optical IC chip 24 respectively. The arrays 34, 36 are joined to both end surfaces a, b of the optical IC chip 24 while adjusting the optical axes respectively. That is, the second array 36 is joined to the end surface a in the vicinity of the polarizer 32, and the first array 34 is joined to the end surface b in the vicinity of the phase modulator 30.

When the respective arrays 34, 36 are joined (or glued with an adhesive in this embodiment), each of them is joined while adjusting the optical axis so that the light output is most intense. As shown in FIG. 4B, the optical axis is adjusted for the three axial directions of X, Y, Z and the rotational direction for the two cores, concerning the first array 34. The optical axis is adjusted for the three axial directions of X, Y, Z concerning the second array 36.

Figure 5A:
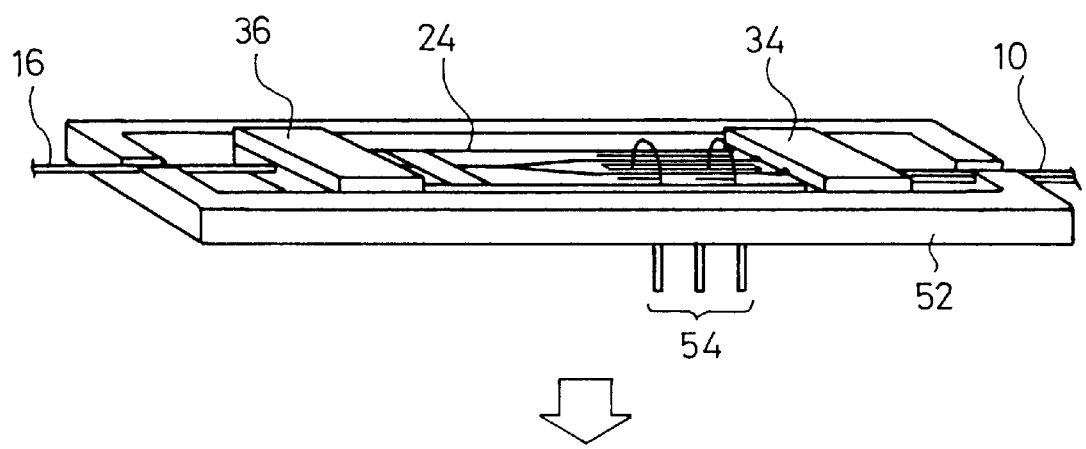
FIG. 5A illustrates a step of wire bonding for the optical IC chip.
Figure 5B:
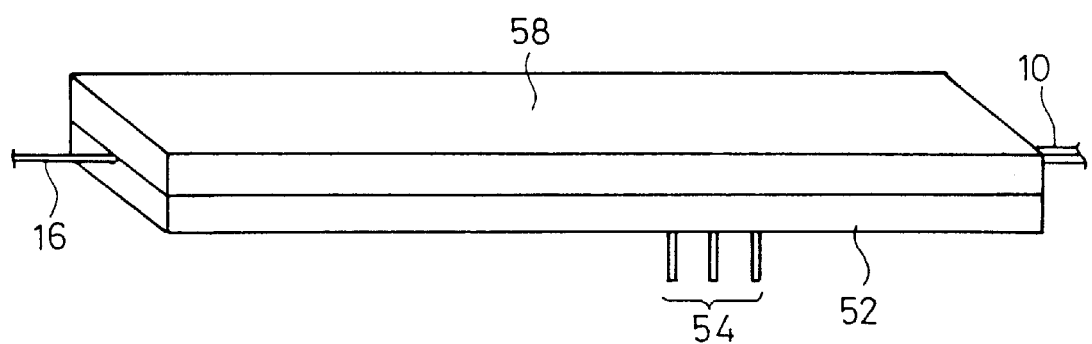
FIG. 5B illustrates a step of packaging.

When the operation for joining the first and second arrays 34, 36 to the optical IC chip 24 is completed, the optical IC chip 24 is accommodated in a main package body 52 as shown in FIG. 5A. A wire bonding process is performed in order to electrically connect lead terminals 54 led downwardly from the main package body 52, to a conductive pad of the phase modulator 30 disposed on the optical IC chip 24 by using bonding wires 56. After that, as shown in FIG. 5B, the main package body 52 is covered with a cover member 58.

After executing the steps described above, the substantial process for joining the optical IC chip 24 to the optical fiber 10 led from the fiber coil 12 and the optical fiber 16 led from the coupler 22 is completed.

Next, explanation will be made with reference to FIGS. 6 to 9 for the arrangement of the optical fiber gyroscope according to the first embodiment described above and an assembling jig used in the assembling steps for the optical fiber gyroscope.

Figure 6:
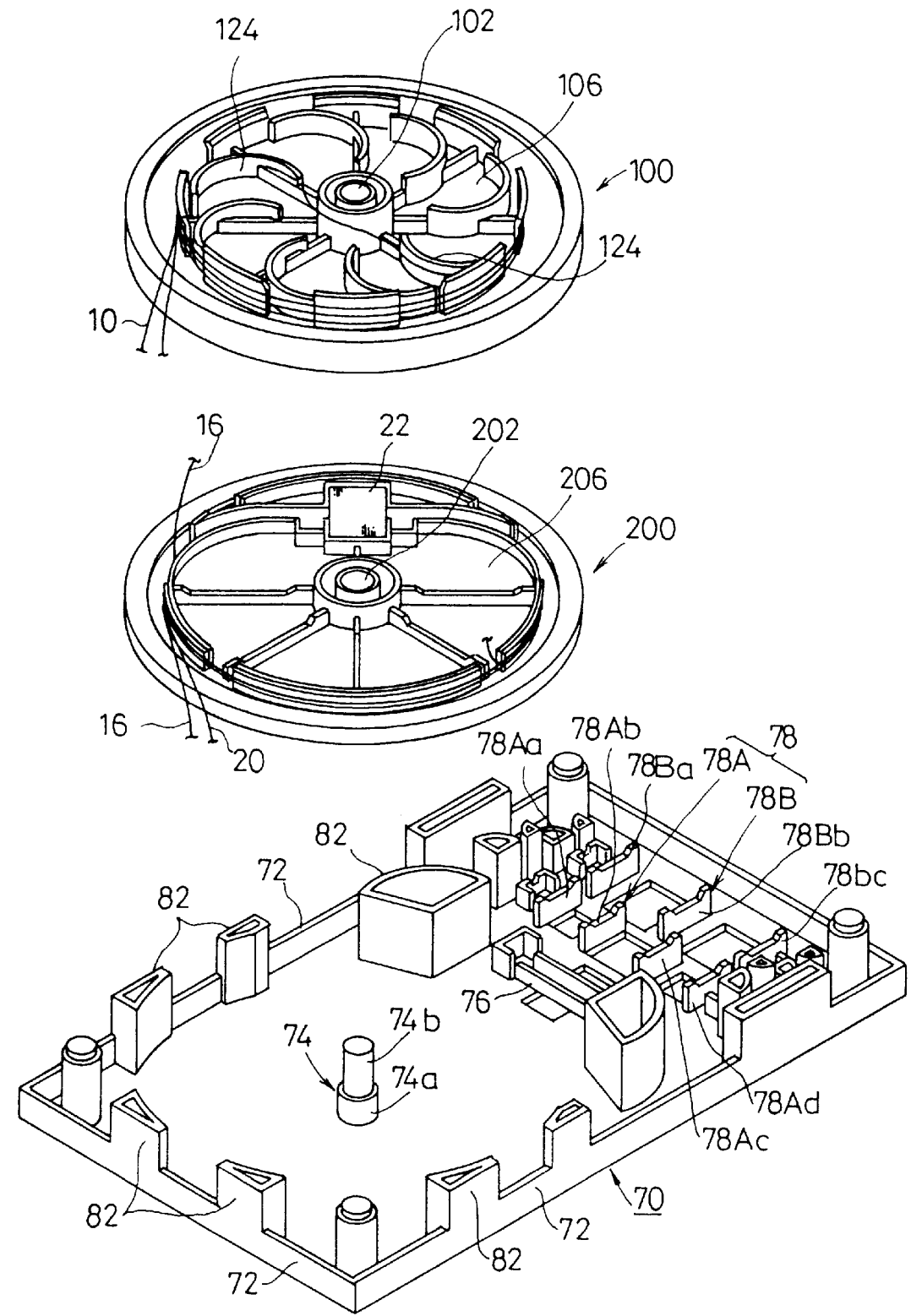
FIG. 6 shows a perspective view illustrating an arrangement of the optical fiber gyroscope according to the first embodiment, and an assembling jig used to assemble the optical fiber gyroscope.
Figure 7:
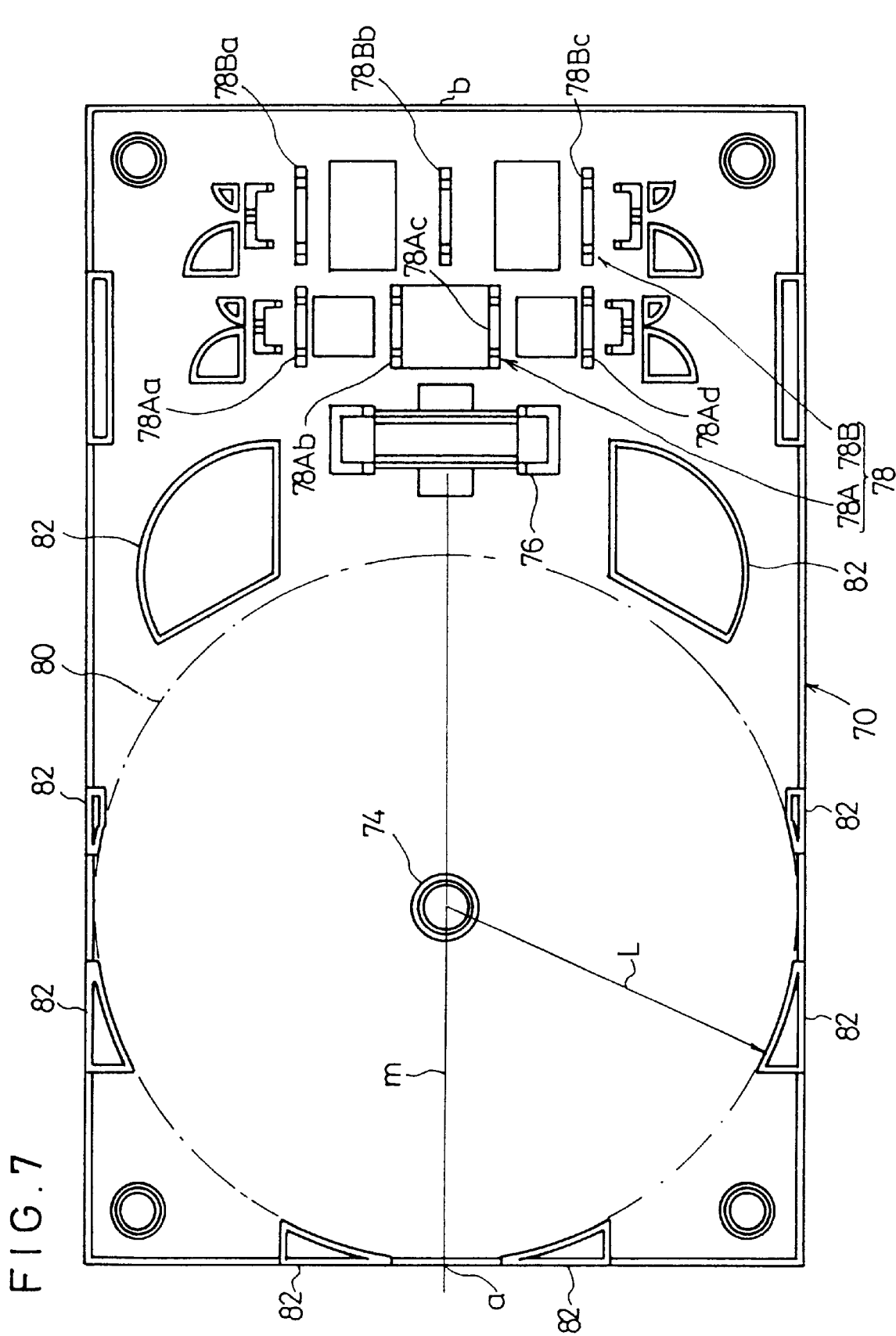
FIG. 7 shows a plan view of the assembling jig.

At first, as shown in FIG. 6, the assembling jig 70 is open at its upper surface, and it is composed of, for example, synthetic resin integrally molded into one unit to have a box-shaped configuration with its rectangular plane provided with side walls 72 rising upwardly at its four sides. A support shaft 74, which is composed of synthetic resin, is integrally formed at a predetermined position on the bottom surface of the assembling jig 70. A chip-placing stand 76 and a package-operating stand 78, which are composed of synthetic resin, are integrally formed at other positions on the bottom surface.

As shown in FIG. 6, the support shaft 74 has a ring-shaped step section at an approximately intermediate portion in the height direction. The step section is used as a boundary for a lower section 74a which has a diameter larger than a diameter of an upper section 74b.

The package-operating stand 78 comprises two types of placing stands. One is a main package body-placing stand 78A for placing and fixing the main package body 52 shown in FIG. 5 described above, and the other is a cover member-placing stand 78B for placing and fixing the cover member 58 of the main package body 52.

The main package body-placing stand 78A is arranged between the chip-placing stand 76 and the other end b on the center line m, and it is disposed at a position separated from the chip-placing stand 76 toward the other end b by a distance of about ⅓ of a distance therebetween. The main package body-placing stand 78A comprises four upstanding tabs 78A$a$ to 78A$d$ which rise upwardly in parallel to one another from the bottom surface of the assembling jig 70.

The cover member-placing stand 78B is arranged between the chip-placing stand 76 and the other end b on the center line m, and it is disposed at a position separated from the chip-placing stand 76 toward the other end b by a distance of about ⅔ of the distance therebetween. The cover member-placing stand 78B comprises three upstanding tabs 78B$a$ to 78B$c$ which rise upwardly in parallel to one another from the bottom surface of the assembling jig 70.

A plurality of partition blocks 82 made of synthetic resin, which are used to define a circular region 80 with a radius of a predetermined distance L from the support shaft 74, are provided integrally at key places around the center of the support shaft 74 on the bottom surface of the assembling jig 70. The fiber coil reel 100 wound with the optical fiber 10 for constructing the fiber coil 12, and the coupler reel 200 led from the coupler 22 and wound with the optical fiber 16 are rotatably placed in the circular region 80 respectively.

Figure 8A:
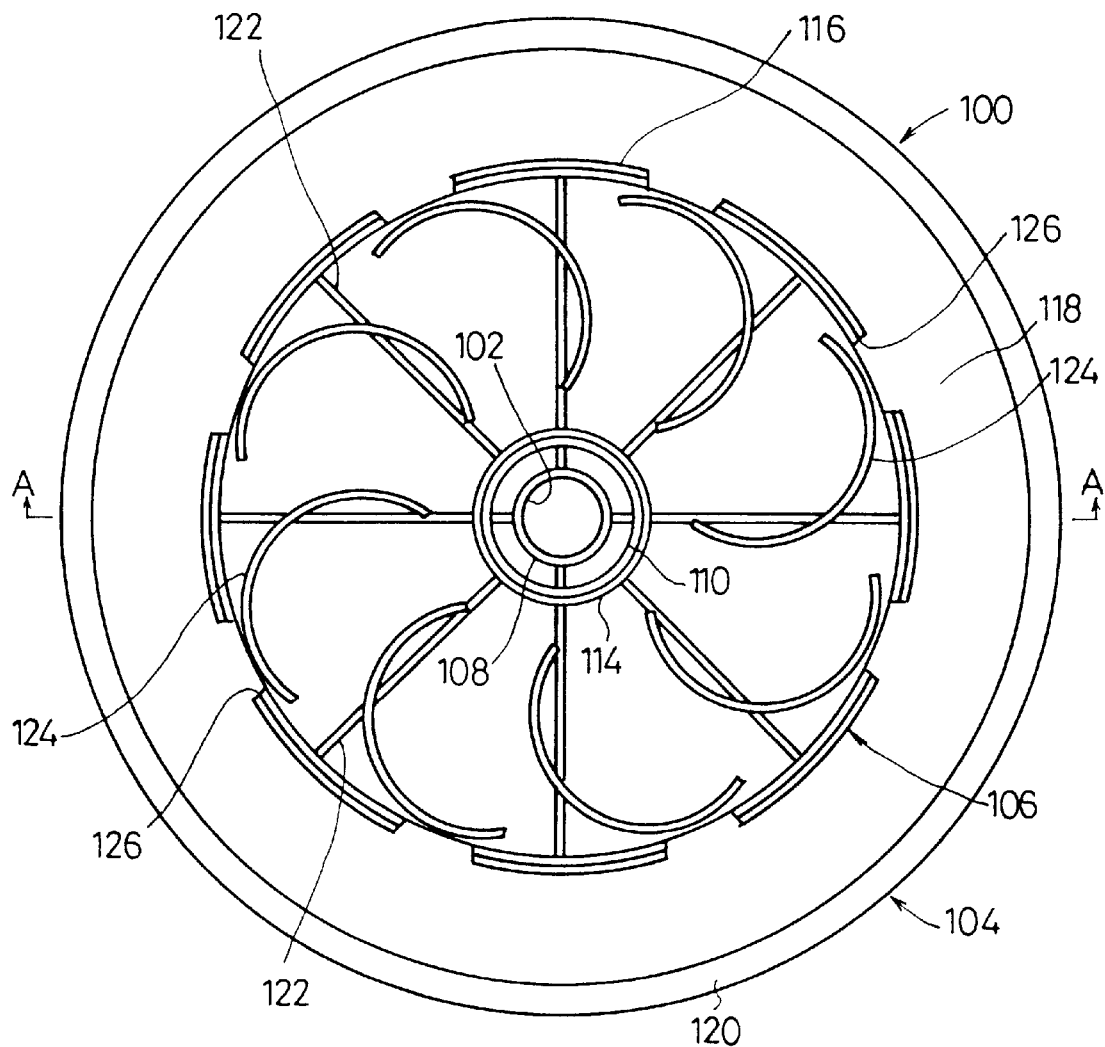
FIG. 8A shows a plan view illustrating the fiber coil reel.
Figure 8B:
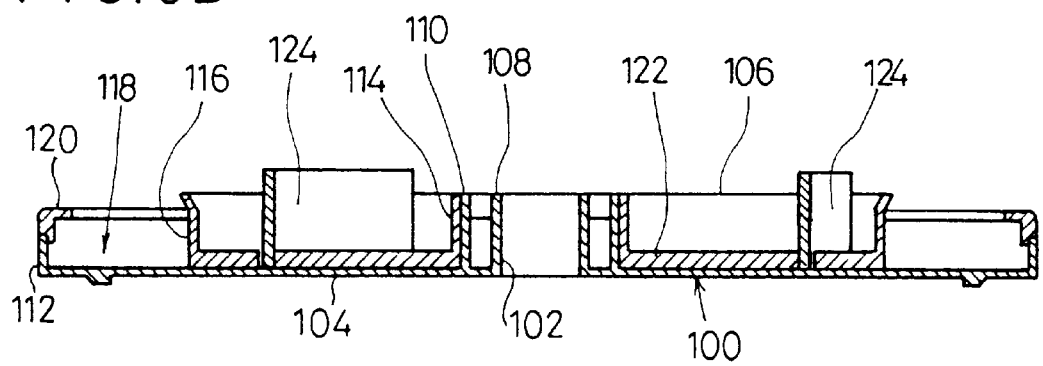
FIG. 8B shows a sectional view taken along a line A—A shown in FIG. 8A.

That is, as shown in FIG. 8, the fiber coil reel 100 is constructed such that a ring member 106 for reversing the winding direction of the optical fiber 10 is superimposed on a circular substrate 104 made of, for example, synthetic resin having a through-hole 102 at its center.

The circular substrate 104 is integrally formed with a ring-shaped first inner wall 108 which rises upwardly along the outer circumference of the central through-hole 102, a ring-shaped second inner wall 110 which has a diameter larger than the diameter of the first inner wall 108 and which rises at the position concentric with the first inner wall 108, and a ring-shaped outer wall 112 which rises upwardly along the outer circumference of the circular substrate 104.

The ring member 106 has its inner diameter which is approximately equal to the outer diameter of the second inner wall 110 of the circular substrate 104, and it has its outer diameter which is smaller than the outer diameter of the circular substrate 104. The ring member 106 is integrally formed with an inner wall 114 and an outer wall 116 which are disposed at inner and outer circumferential portions to rise upwardly along the inner and outer circumferences respectively.

According to the construction as described above, a ring-shaped winding space 118 is formed between the inner surface of the outer wall 112 of the circular substrate 104 and the outer surface of the outer wall 116 of the ring member 106. Although not shown, the lengthy optical fiber 10 is wound around the outer wall 116 of the ring member 106 in the winding space 118. A ring-shaped holding member 120 is attached to the upper portion of the outer wall 112 of the circular substrate 104 so that the wound optical fiber 10 does not protrude to the outside with ease. The holding member 120 has its inner diameter which is designed to be larger than the outer diameter of the ring member 106, with the winding space 118 being directed upwardly. Thus, the optical fiber 10 can be easily wound around the outer wall 116 of the ring member 106 by the human hand or by using an automated winding apparatus.

A plurality of (eight individuals in the embodiment shown in FIG. 8A) reinforcing support ribs 122 are integrally arranged at equal angular intervals on the bottom surface of the ring member 106. Semicircular guide strips 124 are provided integrally or separately at positions corresponding to the plurality of support ribs 122 respectively. That is, in the embodiment shown in FIG. 8, four pairs of guide strips 124 are arranged, one pair of semicircular guide strips 124 being disposed at positions of point symmetry with each other.

The ring member 106 has eight cutouts 126 which are formed at equal intervals through the outer wall 116. The cutouts 126 are formed at the following specified positions. That is, the cutout 126 is provided at a portion at which the outer wall 116 intersects a line which approximately equally divides the angle formed by mutually adjacent two support ribs 122. Further, a part of the guide strip 124 is opposed to each of the cutouts 126.

Therefore, for example, the following operation is effected for a certain pair of guide strips 124 arranged at the arbitrary positions of point symmetry, during the process for winding the optical fiber 10 around the outer wall 116 of the ring member 106. That is, the optical fiber 10 is allowed to pass through the cutout 126 opposed to one of the guide strips 124. The optical fiber 10 is allowed to extend along the semicircular convex configuration of one of the guide strips 124. Further, the optical fiber 10 is allowed to extend along the semicircular convex configuration of the other guide strip 124. The optical fiber 10 is allowed to pass through the cutout 126 opposed to the other guide strip 124. Thus, the optical fiber 10 can be wound in a direction opposite to the winding direction before allowing the optical fiber 10 to pass through the cutout 126. That is, the pair of guide strips 124, 124, which are disposed at the positions of point symmetry to one another, constitute a winding direction-reversing section for reversing the winding direction of the optical fiber 10. It is needless to say that the direction-reversing section is not necessarily disposed at the positions of point symmetry as in this embodiment, provided that the direction-reversing section serves to reverse the winding direction of the optical fiber 10.

Figure 9A:
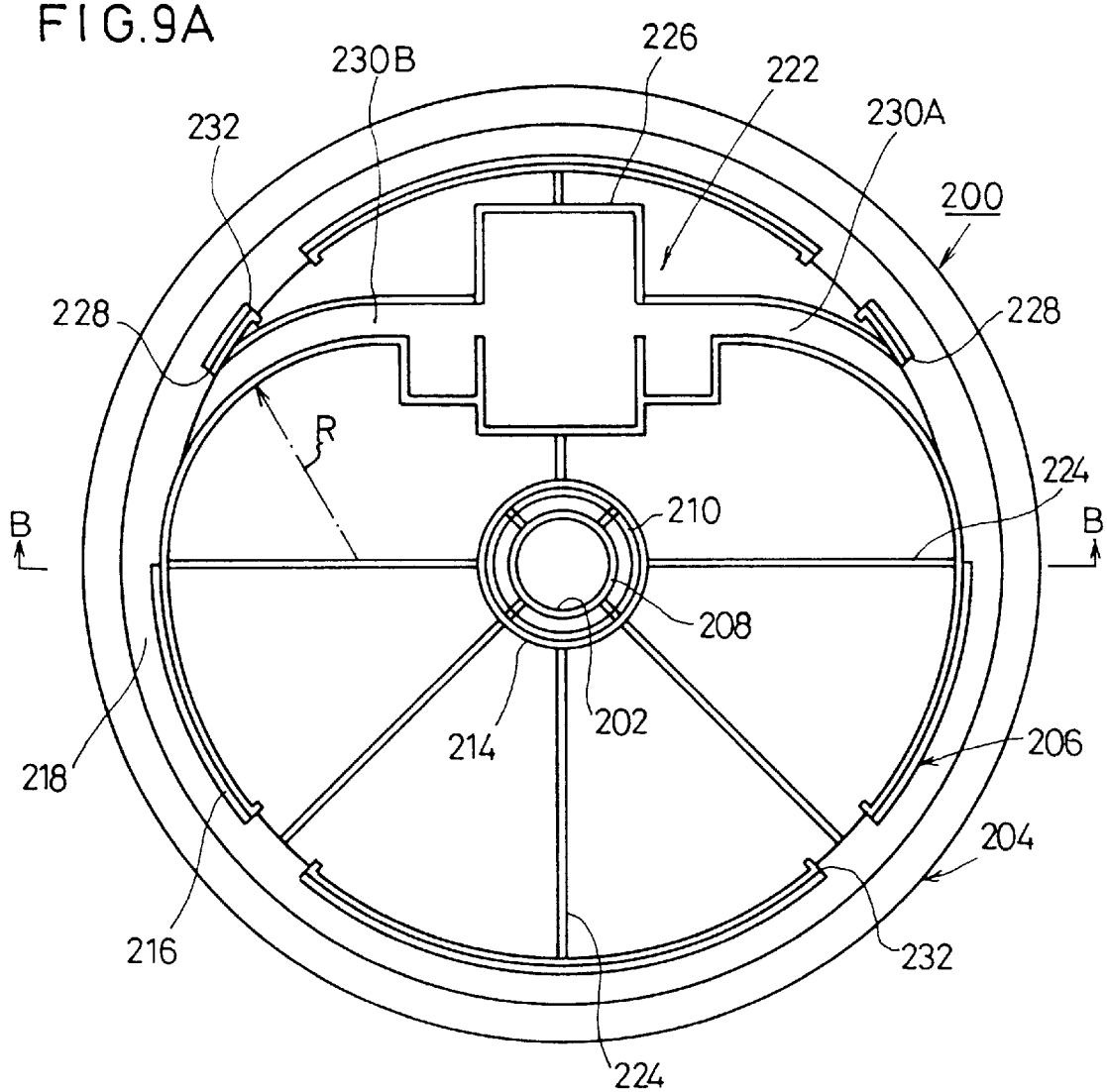
FIG. 9A shows a plan view illustrating a coupler reel.
Figure 9B:
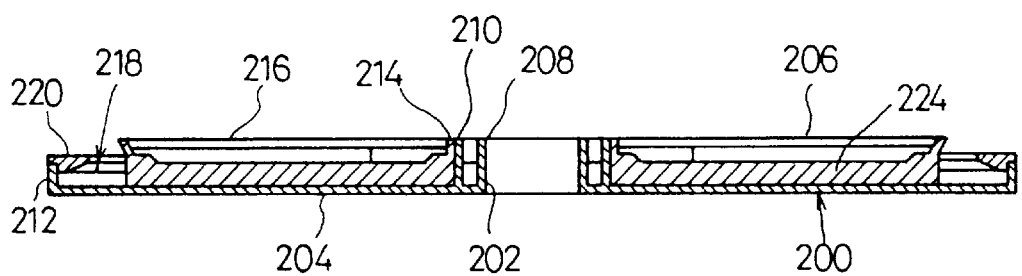
FIG. 9B shows a sectional view taken along a line B—B shown in FIG. 9A.

On the other hand, as shown in FIG. 9, the coupler reel 200 is basically constructed in the same manner as the fiber coil reel 100 described above. The coupler reel 200 comprises a ring member 206 for accommodating the coupler 22, the ring member 206 being superimposed on a circular substrate 20 made of, for example, synthetic resin having a through-hole 202 at its center.

The circular substrate 204 is integrally formed with a ring-shaped first inner wall 208 which rises upwardly along the outer circumference of the central through-hole 202, a ring-shaped second inner wall 210 which has a diameter larger than the diameter of the first inner wall 208 and which rises at the position concentric with the first inner wall 208, and a ring-shaped outer wall 212 which rises upwardly along the outer circumference of the circular substrate 204.

The ring member 206 has its inner diameter which is approximately equal to the outer diameter of the second inner wall 210 of the circular substrate 204, and it has its outer diameter which is smaller than the outer diameter of the circular substrate 204. The ring member 206 is integrally formed with an inner wall 214 and an outer wall 216 which are disposed at inner and outer circumferential portions to rise upwardly along the inner and outer circumferences respectively.

According to the construction as described above, a ring-shaped winding space 218 is formed between the inner surface of the outer wall 212 of the circular substrate 204 and the outer surface of the outer wall 216 of the ring member 206. Although not shown, the optical fiber 16, which is led from the coupler 22, is wound around the outer wall 216 of the ring member 206 in the winding space 218. A ring-shaped holding member 220 is attached to the upper portion of the outer wall 212 of the circular substrate 204 so that the wound optical fiber 16 does not protrude to the outside with ease. The holding member 220 has its inner diameter which is designed to be larger than the outer diameter of the ring member 206, with the winding space 218 being directed upwardly. Thus, the optical fiber 16 can be easily wound around the outer wall 216 of the ring member 206 by the human hand or by using an automated winding apparatus.

A coupler-holding structure 222 for accommodating and holding the coupler 22 (not shown) is provided at an upper half portion on the bottom surface of the ring member 206 as shown in FIG. 9A. A plurality of (five individuals in the embodiment shown in FIG. 9A) reinforcing support ribs 224 are integrally arranged at equal angular intervals at a lower half portion as shown in FIG. 9A. The coupler-holding structure 222 comprises a frame 226 formed to correspond to the outer configuration of the coupler 22, and two optical fiber guides 230A, 230B formed to extend from both right and left sides of the frame 226 toward cutouts 228 formed through the outer wall 216 of the ring member 206.

In the embodiment shown in FIG. 9A, it is assumed that the outer configuration of the coupler 22 is a rectangular parallelepiped. The accommodating space, which is formed by the frame 226, is also constructed to form a rectangular parallelepiped. Each of the two optical fiber guides 230A, 230B extends in the lateral direction from the frame 226 over a predetermined distance. The optical fiber guide 230A, 230B is formed to be curved at a predetermined curvature (radius of curvature R) from the point of the predetermined distance to the outer wall 216 (strictly, to the cutout 228) of the ring member 206. The radius of curvature R is defined to give the length of a degree in which the optical fibers 16, 20 led from the coupler 22 are guided substantially naturally to the winding space 218, and the light which is transmitted through the optical fibers 16, 20 is not affected thereby. Four cutouts 232 are formed at equal intervals respectively through the outer wall 216 of the ring member 206, in addition to the cutouts 228 for guiding the optical fibers 16, 20 to the winding space 218. Explanation will now be made for the dimensional difference between the circular substrate 104 of the fiber coil reel 100 and the circular substrate 204 of the coupler reel 200 respectively. The circular substrate 104 of the fiber coil reel 100 is designed to have its inner diameter which is smaller than the circular substrate 204 of the coupler reel 200. The inner diameter of the circular substrate 104 is approximately the same as the diameter of the upper section 74b of the support shaft 74 of the assembling jig 70 shown in FIG. 6. The inner diameter of the circular substrate 204 of the coupler reel 200 is approximately the same as the diameter of the lower section 74a of the support shaft 74. The heights of the circular substrate 104 and the ring member 106 of the fiber coil reel 100 are designed to be larger than the heights of the circular substrate 204 and the ring member 206 of the coupler reel 200 respectively.

Therefore, when the reels 100, 200 are rotatably placed in the reel-placing region 80 of the assembling jig 70, at first, the coupler reel 200 having the lower height is rotatably fitted through the through-hole 202 to the lower section 74a of the support shaft 74. Thus, the reel 200 is placed in the reel-placing region 80. After that, the fiber coil reel 100 is rotatably fitted through the through-hole 102 to the upper section 74b of the support shaft 74. Thus, the fiber coil reel 100 is rotatably supported by the support shaft 74 over the coupler reel 200.

Next, explanation will be made with reference to FIGS. 10 and 11 for the process of assembling the optical fiber gyroscope according to the first embodiment by using the assembling jig 70. In FIGS. 10 and 11, especially detailed constitutive components are not illustrated, and principal constitutive components are mainly illustrated in a schematic manner, in order to easily understand the process of winding the optical fiber around each of the reels, and packaging the optical IC chip.

Figure 10A:
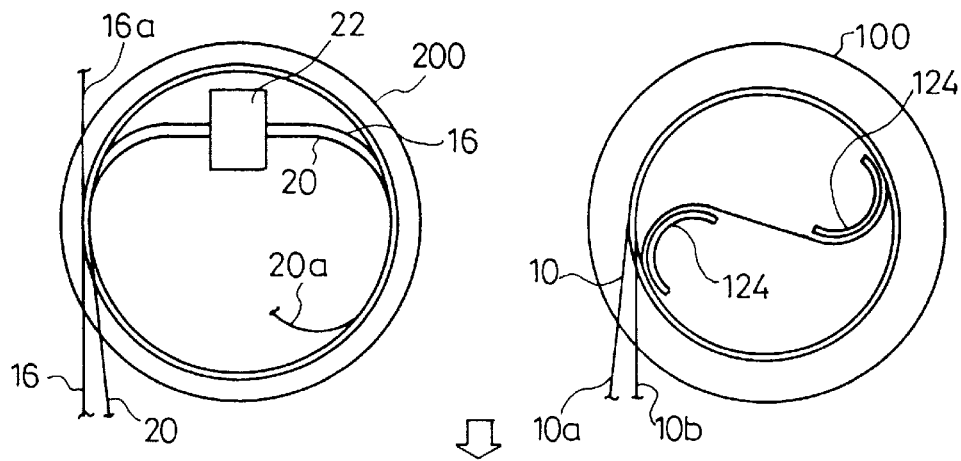
FIG. 10A illustrates a step of winding the optical fiber around each of the reels.

At first, as shown in FIG. 10A, the lengthy optical fibers 16, 20 are wound around the coupler reel 200. The coupler 22 is attached to the frame 226 of the coupler reel 200 (see FIG. 9A). Further, the optical fibers 16, 20 led from the coupler 22 are wound around the coupler reel 200.

Specifically, explanation will be made with reference to FIG. 8 as well. The lengthy optical fiber 10 is wound around the fiber coil reel 100 such that the optical fiber 10 is wound around the outer wall 116 of the ring member 106 while allowing the optical fiber 10 to enter the winding space 118 of the reel 100 in a state in which the starting end 10a of the optical fiber 10 is gripped. In the last one turn, the optical fiber 10 is allowed to extend along the arbitrary pair of guide strips 124, 124 formed on the ring member 106 to reverse the winding direction. The terminal end 10b of the optical fiber 10 is led toward the starting end 10a. At this stage, the operation for winding the optical fiber 10 around the fiber coil reel 100 is completed.

On the other hand, the optical fibers 16, 20, which are led from the coupler 22 attached to the frame 226, are wound around the coupler reel 200 as follows. For example, as shown in FIG. 10A, the two optical fibers (the optical fiber 16 to be connected to the optical IC chip and the unused optical fiber 20), which are led from the right side of the coupler 22, are drawn out to the winding space 218 through the rightward optical fiber guide 230A shown in FIG. 9. The two drawn optical fibers 16, 20 are wound, for example, clockwise around the outer wall 216 of the ring member 206. The starting end 16a of the optical fiber 16 to be connected to the optical IC chip 24 is led to the outside of the reel 200. The starting end 20a of the unused optical fiber 20 is accommodated in the ring member 206.

Next, as shown in FIG. 10A, the two optical fibers (the optical fiber 16 to be connected to the light source 14 shown in FIG. 1 and the optical fiber 20 to be connected to the photodetector 18), which are led from the left side of the coupler 22, are drawn out to the winding space 218 through the leftward optical fiber guide 230B shown in FIG. 9. The drawn two optical fibers 16, 20 are wound, for example, counterclockwise around the outer wall 216 of the ring member 206. The respective ends are led to the outside of the reel 200. At this stage, the operation for winding the optical fibers 16, 20 led from the coupler 22 around the coupler reel 200 is completed.

Figure 10B:
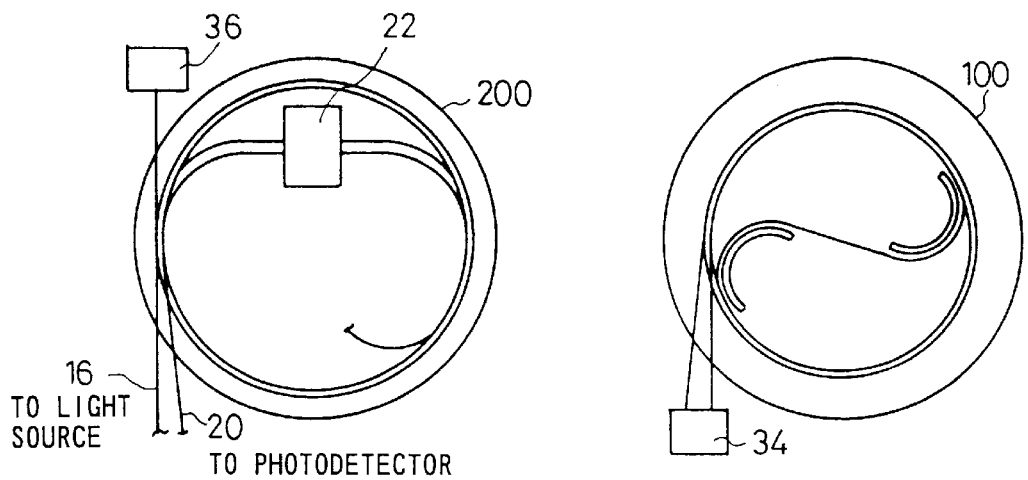
FIG. 10B illustrates a step of gluing the array to the end of the optical fiber.

Next, as shown in FIG. 10B, the first array 34 is glued to the starting end 10a and the terminal end 10b of the optical fiber 10 led to the outside of the fiber coil reel 100. The second array 36 is glued to the end 16a of the optical fiber 16 to be connected to the optical IC chip 24, of the optical fibers 16, 20 led to the outside of the coupler reel 200. Explanation has been made with reference to FIGS. 2 and 3 for the method in which the first array 34 is glued to the optical fiber 10 and the second array 36 is glued to the optical fiber 16. Therefore, duplicate explanation for the method will be omitted.

Next, the end surface 34a on the side of the free end of the optical fiber 10, of the end surfaces of the first array 34 (see FIG. 2B) is polished, and the end surface 36a on the side of the free end of the optical fiber 16, of the end surfaces of the second array 36 (see FIG. 3B) is polished.

Those usable as the polishing apparatus to be used to polish the end surface 34a of the first array 34 include, for example, an apparatus comprising a wrapping sheet fixed on a wrapping disk driven and rotated by a motor.

In this embodiment, it is necessary to polish the first array 34 secured to the end of the optical fiber 10 drawn out from the reel 100. Therefore, it is desirable to use, for example, a polishing jig comprising a reel-placing base capable of placing a plurality of reels 100 thereon, and an array-fixing member disposed at a lower portion of the reel-placing base, for fixing the plurality of first arrays 34 drawn out from the reel 100 at a predetermined angle respectively, and exposing the respective end surfaces 34a of the first arrays 34 from the bottom surface.

The bottom surface of the array-fixing member is allowed to make contact with the rotating wrapping sheet of the polishing apparatus to polish the end surface 34a of the first array 34 exposed from the bottom surface of the polishing jig (especially the array-fixing member). Thus, the end surface 34a of the first array 34 secured to the optical fiber 10 can be easily polished in conformity with the inclination of the end surface a of the optical IC chip 24. The polishing treatment is also performed for the second array 36 in the same manner as described above.

Figure 10C:
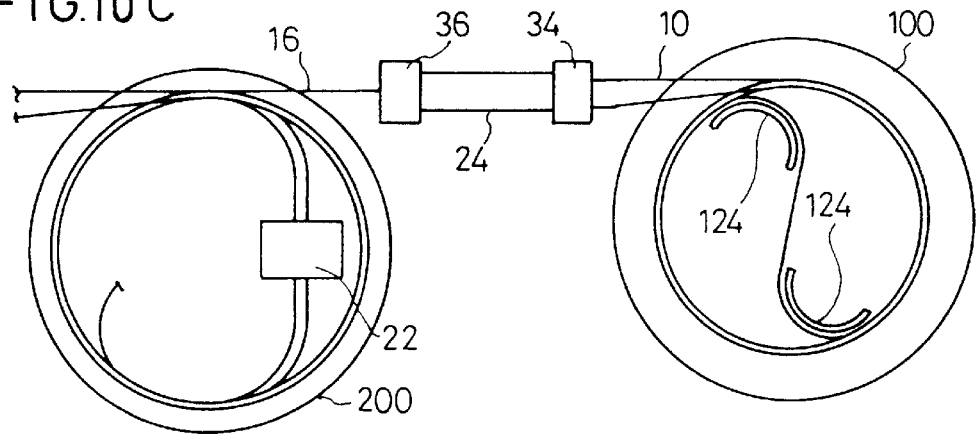
FIG. 10C illustrates a step of optically coupling the optical fiber to the optical IC chip.

Next, as shown in FIG. 10C, the optical IC chip 24 is prepared, in which the polarizer 32 and the phase modulator 30 are formed on the optical waveguide 28 shown in FIG. 1 described above. The first and second arrays 34, 36, to which the optical fibers 10, 16 have been glued, are joined to the optical IC chip 24 respectively. The joining method has been already explained with reference to FIG. 4, duplicate explanation of which will be omitted.

At the stage at which the operation for joining the first and second arrays 34, 36 to the optical IC chip 24 is completed, the coupler reel 200, around which the optical fibers 16, 20 are wound, is in turn rotatably fitted to the lower section 74a of the support shaft 74 of the assembling jig 70 (see FIG. 6) through the through-hole 202 as shown in FIG. 11A. Thus, the reel 200 is placed on the reel-placing region 80. Subsequently, the fiber coil reel 100, around which the optical fiber 10 is wound, is rotatably fitted to the upper section 74b of the support shaft 74 (see FIG. 6) through the through-hole 102. Thus, the reel 100 is rotatably supported on the reel-placing region 80. The optical IC chip 24, to which the optical fibers 10, 16 are joined through the first and second arrays 34, 36, is temporarily placed on the chip-placing stand 76 of the assembling jig 70 (see FIG. 6).

Next, as shown in FIG. 11A, the main package body 52 is placed and fixed on the main package body-placing stand 78A of the assembling jig 70 (see FIG. 6), and the cover member 58 of the main package body 52 is placed on the cover member-placing stand 78B. After that, the optical IC chip 24, which is temporarily placed on the chip-placing stand 76, is picked up, and it is accommodated in the main package body 52 placed and fixed on the main package body-placing stand 78A. During this process, when the optical IC chip 24 is moved toward the main package body-placing stand 78A, the both reels 100, 200 are easily rotated so that the optical fibers 10, 16 are freely drawn out. Subsequently, as explained with reference to FIG. 5A, the wire bonding process is performed to electrically connect the lead terminal 54 led downwardly from the main package body 52 to the conductive pad of the phase modulator 30 on the optical IC chip 24.

After that, as explained with reference to FIG. 5B, the cover member 58, which is placed on the cover member-placing stand 78B, is picked up to cover the main package body 52 therewith. Further, the main package body 52 is joined to the cover member 58.

After executing the steps described above, the substantial process for joining the optical IC chip 24 to the optical fiber 10 led from the fiber coil 12 and the optical fiber 16 led from the coupler 22 is completed.

As described above, the optical fiber gyroscope according to the first embodiment uses the fiber coil reel 100 according to the first embodiment in which the lengthy optical fiber 10 for constructing the fiber coil 12 is wound to make the predetermined number of turns. Accordingly, the lengthy optical fiber 10 for constructing the fiber coil 12 can be wound around the fiber coil reel 100, and it can be accommodated in the reel 100. There is no problem that the long optical fiber 10 for constructing the fiber coil 12 is obstructive during the operation for assembling the optical fiber gyroscope, for example, during the operation in which the optical fiber 10 led from the fiber coil 12 is optically coupled to the optical IC chip 24, and during the operation in which the optical IC chip 24 coupled with the optical fiber 10 is packaged. There is no inconvenience as well that any excessive load is exerted on the optical IC chip 24 by the long optical fiber 10.

The through-hole 102 is formed through the fiber coil reel 100 to rotatably support the reel 100 by means of the support shaft 74 provided on the assembling jig 70. Accordingly, when the optical IC chip 24 is moved toward the main package body-placing stand 78A, the fiber coil reel 100 is easily rotated so that the optical fiber 10 is freely drawn out. As a result, the packaging operation is easily performed, and it is possible to finish the operation for a short period of time.

The fiber coil reel 100, especially the ring member 106 thereof is provided with the winding direction-reversing section (the pair of guide strips 124, 124 disposed at the positions of point symmetry with each other) for reversing the winding direction of the optical fiber 10 wound in the winding space 118 around the outer wall 116 of the ring member 106. Accordingly, the terminal end 10*b* of the optical fiber 10 can be easily led toward the starting end 10*a* by winding the optical fiber 10 around the outer wall 116 of the ring member 106 in the state in which, for example, the starting end 10*a* of the optical fiber 10 is gripped, and reversing the winding direction of the optical fiber 10 by using the winding direction-reversing section, for example, in the final turn. It is extremely easy to perform the optical coupling to the optical IC chip 24 thereafter.

Especially, as shown in FIG. 6, the large number of pairs of guide strips 124, 124 are provided. Thus, the winding direction of the optical fiber 10 can be reversed by the aid of the arbitrary pair of guide strips 124, 124. Therefore, when the optical fiber 10 is guided to the winding direction-reversing section, and when the optical fiber 10 is guided from the winding direction-reversing section to the winding space 118, there is no restriction at all for the position for introducing the optical fiber 10 and for the position for leading the optical fiber 10 as well as for the introducing direction and for the leading direction thereof. Thus, the optical fiber 10 can be easily led to the winding direction-reversing section, and the optical fiber 10 can be returned to the original winding space 118 by easily reversing the winding direction.

As shown in FIG. 6, the winding direction-reversing section is constructed by using the pair of guide strips 124, 124. Thus, the winding direction-reversing section can be easily constructed, and it is possible to more efficiently reduce the production cost.

In the embodiment of the present invention, the outer wall 116 of the ring member 106 is provided with the large number of cutouts 126 for leading the optical fiber 10 to the winding direction-reversing section and for returning, to the winding space 118, the optical fiber for which the winding direction has been reversed by the winding direction-reversing section. Accordingly, it is possible to smoothly guide the optical fiber 10 between the winding direction-reversing section and the winding space.

Further, the holding member 120 is attached to the upper portion of the outer wall 112 of the circular substrate 104 of the fiber coil reel 100. Accordingly, the optical fiber 10, which has been wound around the outer wall 116 of the ring member 106, is prevented from easy disengagement from the winding space 118, owing to the holding member 120. Therefore, it is possible to efficiently perform the operation for assembling the optical fiber gyroscope.

The assembling jig 70 shown in FIG. 6 for assembling the optical fiber gyroscope according to the first embodiment is used as follows. That is, the packaging operation is performed on the main package body-placing stand 78A for the optical IC chip 24 which is temporarily placed on the chip-placing stand 76 provided at the predetermined position on the bottom surface.

In this embodiment, the packaging operation can be promptly performed on the main package body-placing stand 78A for the optical IC chip 24. If the packaging operation is performed in any separate step, the following inconveniences would occur. That is, for example, (1) it is necessary to provide any equipment for storing and managing a large number of optical IC chips 24 optically coupled to the optical fibers 10, 16, and (2) the optical IC chip 24 optically coupled to the optical fibers 10, 16 should be transported to any packaging equipment (for example, equipment for resin-enclosing steps and equipment for making storage and management) while paying attention to disconnection at the coupling section. The present invention makes it possible to dissolve these inconveniences. Thus, it is possible to achieve simplification of the assembling equipment and reduce the number of production steps.

In the optical fiber gyroscope according to the first embodiment, the fiber coil reel 100 is used. Accordingly, when the fiber coil 12 is produced, it is enough that the lengthy optical fiber 10 is wound around the fiber coil reel 100 to make the predetermined number of turns. Therefore, the fiber coil 12 can be produced extremely easily in a short period of time.

The assembling jig 70 has the circular reel-placing region 80 for rotatably placing the reel 100 thereon. Accordingly, when the packaging operation is performed for the optical IC chip 24, the fiber coil reel 100 is rotatably placed on the reel-placing region 80. After that, the optical IC chip 24 is temporarily placed on the chip-placing stand 76, and the optical IC chip 24 is moved toward the main package body-placing stand 78A. Thus, the packaging operation can be performed for the optical IC chip 24. During this process, when the optical IC chip is moved toward the operating stand, the reel is easily rotated so that the optical fiber is freely drawn out. Therefore, the packaging operation is easily performed, and it is possible to finish the operation in a short period of time.

The embodiment of the present invention is designed to use the coupler reel 20 which is rotatably placed on the reel-placing region 80. Therefore, the extremely long optical fibers 16, 20, which are led from the coupler 22, can be accommodated while winding them around the coupler reel 200. Further, the coupler reel 200, in which the optical fibers 16, 20 are accommodated, can be rotatably placed in the reel-placing region 80 of the assembling jig 70. When the optical IC chip 24 is moved toward the main package body-placing stand 78A, the reel 200 is easily rotated so that the optical fibers 16, 20 are freely drawn out, in the same manner as in the fiber coil reel 100 described above. As a result, the packaging operation is easily performed, and it is possible to finish the operation in a short period of time.

Especially, in the embodiment of the present invention, the coupler reel 200 is rotatably fitted to the lower section 74a of the support shaft 74 of the assembling jig 70. The fiber coil reel 100 is rotatably fitted to the upper section 74b of the support shaft 74. Accordingly, each of the reels 100, 200 is rotatably supported with respect to the assembling jig 70. Therefore, owing to this arrangement, the respective optical fibers 10, 16 are independently drawn out from the respective reels 100, 200. Thus, the packaging operation can be smoothly performed for the optical IC chip 24 on the main package body-placing stand 78A.

Next, explanation will be made with reference to FIGS. 12 to 14 for an optical fiber gyroscope according to the second embodiment.

As shown in FIG. 12, the optical fiber gyroscope according to the second embodiment comprises a fiber coil reel 300 according to the second embodiment for winding the lengthy optical fiber 10 for constructing the fiber coil 12 therearound, and a coupler reel 400 for holding the coupler 22 and winding the optical fibers 16, 20 led from the coupler 22 therearound.

The fiber coil reel 300 is integrally formed of synthetic resin. A circular recess 302 having a diameter D, which is open upwardly, is formed therein. A through-hole 304 is formed through a bottom central portion of the recess 302. Further, the fiber coil reel 300 is integrally formed with flanges 308, 310 which extend outwardly at upper and lower portions of a circumferential wall 306 of the recess respectively. According to this arrangement, a ring-shaped winding space 312 is defined by the outer circumferential surface of the circumferential wall 306 and the mutually opposing surfaces of the two flanges 308, 310. Although not shown, the lengthy optical fiber 10 is wound around the outer circumferential surface of the circumferential wall 306 in the winding space 312. The fiber coil reel 300 comprises a winding direction-reversing means which is provided at the bottom of the recess 302 for reversing the winding direction of the optical fiber 10. The means may be realized, for example, by providing two semicircular guide strips 314, 316 at positions of point symmetry with each other.

The upper flange 308 is at least provided with a plurality of cutouts 318 for easily leading, to the winding space 312, the optical fiber 10 for which the winding direction has been reversed by the guide strips 314, 316. In the embodiment shown in FIG. 12, the four cutouts 318 are formed at equal intervals respectively.

On the other hand, the coupler reel 400 is integrally formed of synthetic resin in the same manner as the fiber coil reel 300 described above. A circular recess 402 having a diameter d, which is open upwardly, is formed therein. A through-hole 404 is formed through a bottom central portion of the recess 402. Further, the coupler reel 400 is integrally formed with flanges 408, 410 which extend outwardly at upper and lower portions of a circumferential wall 406 of the recess respectively. According to this arrangement, a ring-shaped winding space 412 is formed by the outer circumferential surface of the circumferential wall 406 and the mutually opposing surfaces of the two flanges 408, 410. Although not shown, the lengthy optical fibers 16, 22, which are led from the coupler 22, are wound around the outer circumferential surface of the circumferential wall 406 in the winding space 412.

The coupler reel 400 is formed with, integrally or by adhesion, holding tabs 414 for holding the coupler 22 in the vicinity of the circumferential wall on the bottom of the recess 402. The holding tabs 414 can be used to hold the coupler 22. It is assumed that the coupler 22 has a cylindrical configuration.

The coupler reel 400 also comprises, for example, four cutouts 416 which are formed at equal intervals through the upper flange 408, in the same manner as the fiber coil reel 300 described above. Especially, the pair of cutouts 416, which are formed approximately on both sides of the coupler 22 held by the holding tabs 414, serve to guide the optical fibers 16, 20 led from the coupler 22 to the winding space 412 through the cutouts 416. The other cutouts 416 are used, for example, to accommodate the end 20a of the unused optical fiber 20 (see FIG. 13) in the recess 402 through the cutout 416.

The coupler reel 400 has its outer diameter which is designed to be slightly smaller than the diameter D of the recess 302 of the fiber coil reel 300. Thus, the coupler reel 400 can be accommodated in the recess 302 of the fiber coil reel 300.

Next, a method for assembling the optical fiber gyroscope according to the second embodiment will be explained with reference to FIGS. 13 and 14 as well. When the optical fiber gyroscope is assembled, especially when the optical IC chip 24 is packaged, an assembling jig 500 as shown in FIG. 12 is used.

Explanation will now be briefly made for the arrangement of the assembling jig 500. As shown in FIG. 12, the assembling jig 500 is integrally formed of, for example, synthetic resin into a box-shaped configuration with a rectangular planar shape, which is open upwardly and which is provided with side walls (pair of long side walls 502a and pair of short side walls 502b) rising upwardly at the four sides.

A region for placing the respective reels 300, 400 (reel-placing region 504) is formed on the front side in FIG. 12 on the bottom surface of the assembling jig 500. The reel-placing region 504 is formed by being defined by the pair of long side walls 502a, 502a and one short side wall 502b into a rectangular configuration. A through-hole 506, which is used to insert an unillustrated support shaft in the upward direction, is formed at an approximately central portion of the reel-placing region 504, i.e., at a position opposed to the through-holes 304, 404 formed through the respective reels 300, 400 when the both reels 300, 400 are placed on the reel-placing region 504. Therefore, the fiber coil reel 300, in which the coupler reel 400 is accommodated in the recess 302, is placed in the reel-placing region 504, and the unillustrated support shaft is inserted in the upward direction. Thus, the both reels 300, 400 are easily rotatable about the center of the support shaft.

A chip-placing stand 508 and a package-operating stand 510 for packaging the optical IC chip 24, which are integrally made of, for example, synthetic resin, are disposed on the deep side in FIG. 12 on the bottom surface of the assembling jig 500. The package-operating stand 510 comprises two types of placing stands. One of them is a main package body-placing stand 512 for placing and fixing the main package body 52 (see FIG. 5A). The other is a cover member-placing stand 514 for placing and fixing the cover member 58 of the main package body 52 (see FIG. 5B). The main package body-placing stand 512 comprises four upstanding tabs which rise upwardly in parallel to one another from the bottom surface of the assembling jig 500. The cover member-placing stand 514 comprises three upstanding tabs which rise upwardly in parallel to one another from the bottom surface of the assembling jig 500.

The chip-placing stand 508 is disposed nearest to the reel-placing region 504. The main package body-placing stand 512 is arranged adjacent to the chip-placing stand 508. The cover member-placing stand 514 is arranged next thereto.

Next, explanation will be made with reference to FIGS. 13 and 14 for the process of assembling the optical fiber gyroscope according to the second embodiment by using the assembling jig 500 described above. In FIGS. 13 and 14, especially detailed constitutive components are not illustrated, and principal constitutive components are mainly illustrated in a schematic manner, in order to easily understand the process of winding the optical fibers 10, 16, 20 around each of the reels 300, 400, and packaging the optical IC chip 24.

Figure 13A:
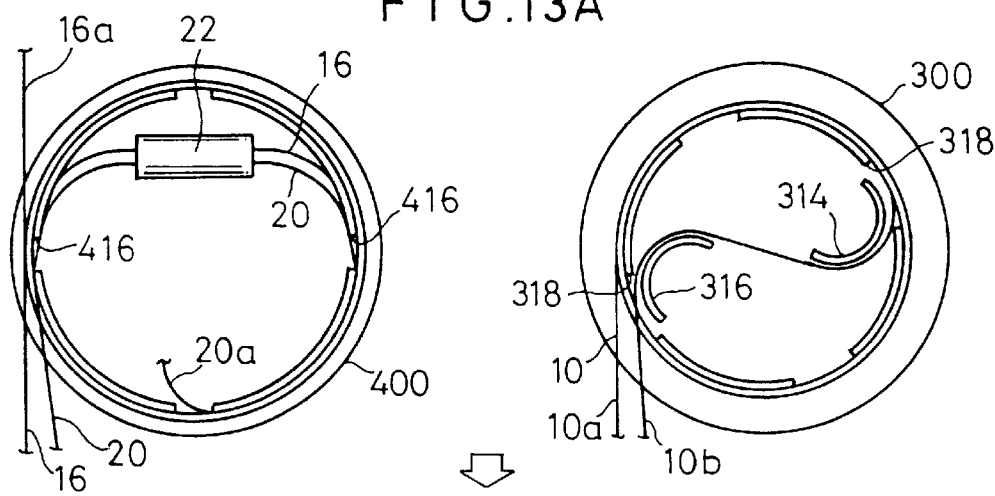
FIG. 13A illustrates a step of winding an optical fiber around each of reels.

At first, as shown in FIG. 13A, the lengthy optical fiber 10 is wound around the fiber coil reel 300. The coupler 22 is interposed and fixed on the coupler reel 400 by using the holding tabs 414. Further, the optical fibers 16, 20 led from the coupler 22 are wound around the coupler reel 400.

Specifically, the lengthy optical fiber 10 is wound around the fiber coil reel 300 such that the optical fiber 10 is wound around the outer circumferential surface of the circumferential wall 306 while allowing the optical fiber 10 to enter the winding space 312 of the reel 300 in a state in which the starting end 10a of the optical fiber 10 is gripped. In the last one turn, optical fiber 10 is allowed to extend along the winding direction-reversing means, i.e., along the pair of guide strips 314, 316 formed on the bottom of the recess 302 to reverse the winding direction. The terminal end 10b of the optical fiber 10 is led toward the starting end 10a. At this stage, the operation for winding the optical fiber 10 around the fiber coil reel 300 is completed.

On the other hand, the optical fiber 10, which is led from the coupler 22 fixed by the holding tabs 414, is wound around the coupler reel 400 as follows. For example, as shown in FIG. 13A, the two optical fibers (the optical fiber 16 to be connected to the optical IC chip 24 and the unused optical fiber 20), which are led from the right side of the coupler 22, are drawn out to the winding space 412 through the rightward cutout 416. The two drawn optical fibers 16, 20 are wound, for example, clockwise around the circumferential wall 406. The end 16a of the optical fiber 16 to be connected to the optical IC chip 24 is led to the outside of the reel 400. The end 20a of the unused optical fiber 20 is accommodated in the recess 402.

Next, as shown in FIG. 13A, the two optical fibers (the optical fiber 16 to be connected to the light source 14 shown in FIG. 1 and the optical fiber 20 to be connected to the photodetector 18), which are led from the left side of the coupler 22, are drawn out to the winding space 412 through the leftward cutout 416. The drawn two optical fibers 16, 20 are wound, for example, counterclockwise around the circumferential wall 406. The respective ends 16a, 20a are led to the outside of the reel 400. At this stage, the operation for winding the optical fibers 16, 20 led from the coupler 22 around the coupler reel 400 is completed.

Figure 13B:
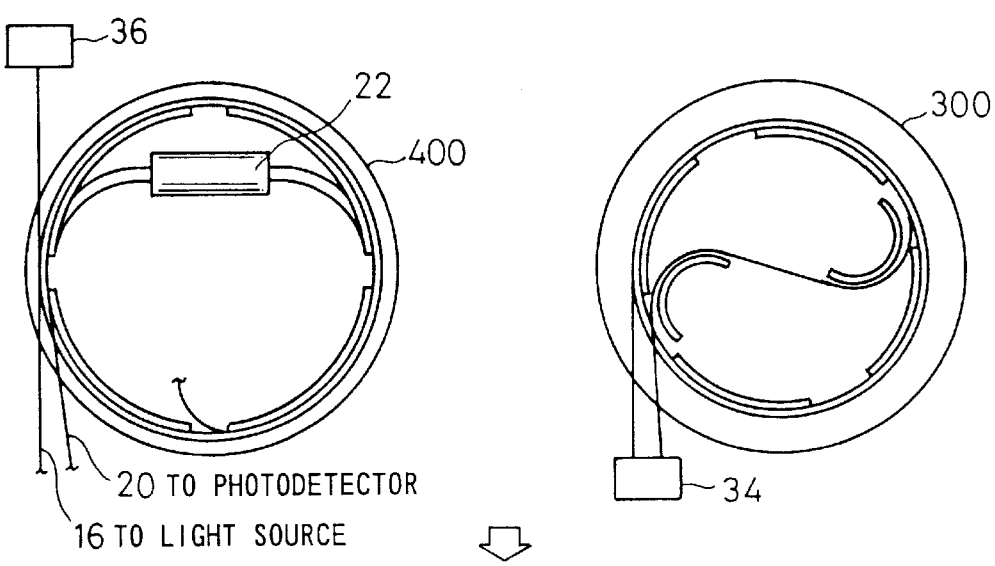
FIG. 13B illustrates a step of gluing an array to the end of the optical fiber.

Next, as shown in FIG. 13B, the first array 34 is fused to the starting end 10a and the terminal end 10b of the optical fiber 10 led to the outside of the fiber coil reel 300. The second array 36 is fused to the end 16a of the optical fiber 16 to be connected to the optical IC chip 24, of the optical fibers 16, 20 led to the outside of the coupler reel 400.

Figure 13C:
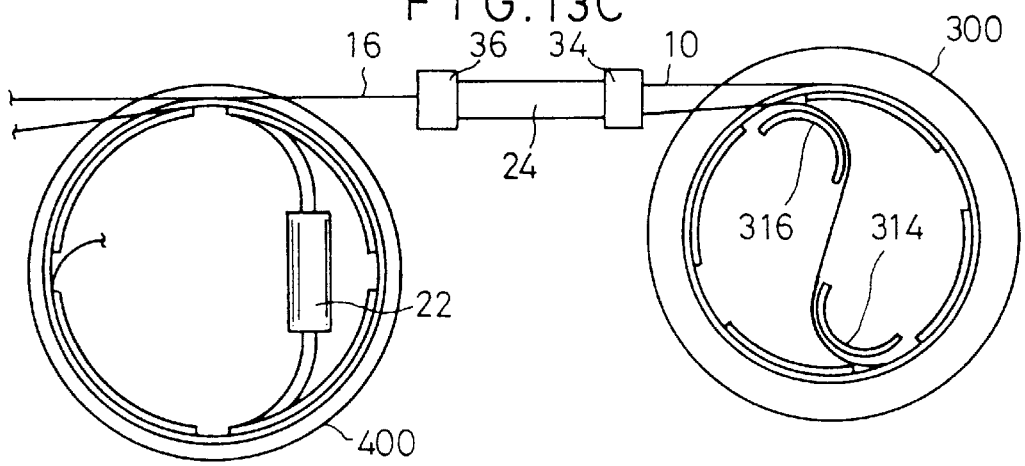
FIG. 13C illustrates a step of optically coupling the optical fiber to an optical IC chip.

Next, as shown in FIG. 13C, the optical IC chip 24 is prepared, in which the polarizer 32 and the phase modulator 30 are formed on the optical waveguide 28 shown in FIG. 1 described above. The first and second arrays 34, 36, to which the optical fibers 10, 16 have been fused, are joined to the optical IC chip 24 respectively.

At the stage at which the operation for joining the first and second arrays 34, 36 to the optical IC chip 24 is completed, the fiber coil reel 300, around which the optical fibers 16, 20 are wound, is placed on the reel-placing region 504 of the assembling jig 500 as shown in FIG. 14A. Further, the coupler reel 400 is accommodated in the recess 302 of the fiber coil reel 300.

It is not necessarily impossible to perform the operation in the following packaging process, if the support shaft is not inserted into the respective through-holes 304, 404. However, without the support shaft, the operation is possibly difficult to be performed due to swinging movement of the respective constitutive members during the packaging process, in view of the dimensional accuracy of the respective constitutive members. Therefore, when the operation is performed after inserting the support shaft through the respective through-holes 304, 404, the both reels 300, 400 are rotated mutually independently about the center of the support shaft. Accordingly, it is possible to suppress the unnecessary swinging movement during the operation.

When the support shaft is inserted to place the respective constitutive members on the assembling jig 500, the unillustrated support shaft is previously inserted in the upward direction through the through-hole 506 of the assembling jig 500. At first, the support shaft is inserted through the through-hole 304 of the fiber coil reel 300. Thus, the reel 300 is rotatably placed in the reel-placing region 504 of the assembling jig 500. Subsequently, the support shaft is inserted through the through-hole 404 of the coupler reel 400. Thus, the reel 400 is rotatably accommodated in the recess 302 of the fiber coil reel 300.

The optical IC chip 24, to which the optical fibers 10, 16 are joined by the aid of the first and second arrays 34, 46, is temporarily placed on the chip-placing stand 508 of the assembling jig 500.

After that, the main package body 52 is placed and fixed on the main package body-placing stand 512 of the assembling jig 500 (see FIG. 12), and the cover member 58 of the main package body 52 is placed on the cover member-placing stand 514.

Next, as shown in FIG. 14B, the optical IC chip 24, which is temporarily placed on the chip-placing stand 508, is picked up, and it is accommodated in the main package body 52 placed and fixed on the main package body-placing stand 512. During this process, when the optical IC chip 24 is moved toward the main package body-placing stand 512, the both reels 300, 400 are easily rotated so that the optical fibers 10, 16 are freely drawn out.

Subsequently, the wire bonding process is performed to electrically connect the lead terminal led downwardly from the main package body 52 to the conductive pad of the phase modulator 30 on the optical IC chip 24. After that, the cover member 58, which is placed on the cover member-placing stand 514, is picked up to cover the main package body 52 therewith.

After executing the steps described above, the substantial process for joining the optical IC chip 24 to the optical fiber 10 led from the fiber coil 12 and the optical fiber 16 led from the coupler 22 is completed.

After that, as shown in FIG. 14C, the support shaft inserted through the assembling jig 500 is pulled out, and the fiber coil reel 300 is taken out of the assembling jig 500 in the state in which the coupler reel 400 is accommodated therein. Thus, the optical fiber gyroscope is completed, in which the optical fibers 10, 16 extending from the respective reels 300, 400 are optically coupled to the optical IC chip 516 after being packaged, and the light source 14 and the photodetector 18 are connected to the optical fibers 16, 20 led from the coupler reel 400.

As described above, the optical fiber gyroscope according to the second embodiment described above uses the coupler reel 400 in which the optical fibers 16, 20 led in the both directions from the coupler 22 are wound to make the predetermined number of turns, in the same manner as in the optical fiber gyroscope according to the first embodiment described above. Accordingly, the extremely long optical fibers 16, 20 led from the coupler 22 can be wound around the coupler reel 400, and thus they can be accommodated therein. There is no problem that the long optical fibers 16, 20 drawn out from the coupler 22 are obstructive during the assembling operation for the optical fiber gyroscope, for example, during the operation in which the optical fiber 16 led from the coupler 22 is optically coupled to the optical IC chip 24, and during the operation in which the optical IC chip 24 coupled with the optical fibers 16, 20 is packaged. There is no inconvenience as well that any excessive load is exerted on the optical IC chip 24 by the long optical fibers 16, 20.

The coupler 22 is interposed by the holding tabs 414 provided on the coupler reel 400 so that the coupler 22 is held by the coupler reel 400. Therefore, it is extremely easy to perform the following assembling operation.

Especially, in the second embodiment, the outer diameter of the coupler reel 400 is designed to be slightly smaller than the diameter D of the recess 302 of the fiber coil reel 300. Therefore, the coupler reel 400 can be accommodated in the recess 302 of the fiber coil reel 300 according to the second embodiment. The respective reels 300, 400 can be constructed into one unit. Accordingly, the structure of the optical fiber gyroscope is compact, and it is possible to facilitate realization of the small size and the light weight of the optical fiber gyroscope.

It is a matter of course that the fiber coil reel according to the present invention is not limited to the embodiments described above, which may be embodied in other various forms without deviating from the gist or essential characteristics of the present invention.

INDUSTRIAL APPLICABILITY

As described above, the fiber coil reel according to the present invention resides in the fiber coil reel associated with an optical fiber wound therearound to make a predetermined number of turns to be used for an optical fiber gyroscope comprising a fiber coil composed of the lengthy optical fiber to make the predetermined number of turns, a coupler for optically coupling an optical fiber led from a light source to an optical fiber to be led to a photodetector, and an optical IC chip arranged between the fiber coil and the coupler and including a phase modulator and a polarizer mounted on an optical waveguide, the fiber coil reel comprising a winding section disposed at its outer circumference for the optical fiber which forms the fiber coil, and a hole disposed at its central portion through which a support shaft is rotatably inserted.

Accordingly, the optical fiber gyroscope can be assembled with ease. It is possible to exclude the inconvenience which would be otherwise caused by any bad handling operation during the production of the optical fiber gyroscope. As a result, the following effects are achieved. That is, the performance of the optical fiber gyroscope can be stabilized, and it is possible to effectively reduce the production cost.

What is claimed is:

1. A fiber coil reel associated with an optical fiber wound therearound to make a predetermined number of turns to be used for an optical fiber gyroscope comprising a fiber coil composed of said lengthy optical fiber to make said predetermined number of turns, a coupler for optically coupling an optical fiber led from a light source to an optical fiber to be led to a photodetector, and an optical IC chip arranged between said fiber coil and said coupler and including a phase modulator and a polarizer mounted on an optical waveguide, said fiber coil reel comprising:

a winding section disposed at its outer circumference for said optical fiber which forms said fiber coil, and a hole disposed at its central portion through which a support shaft is rotatably inserted.

2. The fiber coil reel according to claim 1, further comprising a winding direction-reversing section for reversing a winding direction of said optical fiber in said winding section.

3. The fiber coil reel according to claim 2, wherein said winding direction-reversing section at least comprises a pair of guide strips which are disposed at positions of point symmetry with each other.

4. The fiber coil reel according to claim 2, wherein said winding direction-reversing section comprises a cutout for leading, to said winding section, said optical fiber for which said winding direction has been reversed.

5. The fiber coil reel according to claim 1, further comprising a disengagement-preventive means for said optical fiber wound around said winding section.

* * * * *

UNITED STATES PATENT AND TRADEMARK OFFICE
CERTIFICATE OF CORRECTION

PATENT NO. : 6,038,362

DATED : March 14, 2000

INVENTOR(S) : Shuhei Toyoda, et al.

It is certified that error appears in the above-identified patent and that said Letters Patent is hereby corrected as shown below:

On the title page, Item [57], line 1 delete "100".

On the title page, Item [57], line 2 delete "10".

On the title page, Item [57], line 5 delete "10".

On the title page, Item [57], line 5 delete "22".

On the title page, Item [57], line 6 delete "16".

On the title page, Item [57], line 7 delete "20".

UNITED STATES PATENT AND TRADEMARK OFFICE
CERTIFICATE OF CORRECTION

PATENT NO. : 6,038,362

DATED : March 14, 2000

INVENTOR(S) : Shuhei Toyoda, et al.

It is certified that error appears in the above-identified patent and that said Letters Patent is hereby corrected as shown below:

On the title page, Item [57], line 9 delete "22".

On the title page, Item [57], line 11 delete "10".

On the title page, Item [57], line 12 delete "102".

On the title page, Item [57], line 13 delete "74".

On the title page, Item [57], line 14 delete "70".

UNITED STATES PATENT AND TRADEMARK OFFICE
CERTIFICATE OF CORRECTION

PATENT NO. : 6,038,362

DATED : March 14, 2000

INVENTOR(S) : Shuhei Toyoda, et al.

It is certified that error appears in the above-identified patent and that said Letters Patent is hereby corrected as shown below:

Column 1, line 4, delete "TECHNICAL FIELD" and insert --BACKGROUND OF THE INVENTION--.

Column 1, line 12, delete "BACKGROUND ART".

Column 1, line 63, delete "DISCLOSURE OF THE INVENTION" and insert --SUMMARY OF THE INVENTION--.

Column 3, lines 63 and 64, delete "BEST MODE FOR CARRYING OUT THE INVENTION" and insert --DETAILED DESCRIPTION OF THE INVENTION--.

Column 4, line 55, delete "the".

Column 18, line 4, delete "INDUSTRIAL APPLICABILITY".

Signed and Sealed this

Eleventh Day of July, 2000

*Attest:*

Q. TODD DICKINSON

*Attesting Officer*  *Director of Patents and Trademarks*